US010419259B1

(12) United States Patent
Baldemair et al.

(10) Patent No.: US 10,419,259 B1
(45) Date of Patent: Sep. 17, 2019

(54) TIME-DOMAIN TABLE FOR PUSCH AND MSG3

(71) Applicant: TELEFONAKTIEBOLAGET L M ERICSSON (PUBL), Stockholm (SE)

(72) Inventors: Robert Baldemair, Solna (SE); Asbjörn Grövlen, Stockholm (SE); Jianwei Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/177,169

(22) Filed: Oct. 31, 2018

Related U.S. Application Data

(63) Continuation of application No. PCT/IB2018/057867, filed on Oct. 10, 2018.

(60) Provisional application No. 62/658,535, filed on Apr. 16, 2018.

(51) Int. Cl.
| | |
|---|---|
| *H04L 27/26* | (2006.01) |
| *H04W 74/08* | (2009.01) |
| *H04W 72/04* | (2009.01) |
| *H04B 1/7083* | (2011.01) |

(52) U.S. Cl.
CPC ....... *H04L 27/2621* (2013.01); *H04B 1/7083* (2013.01); *H04L 27/2666* (2013.01); *H04W 72/0413* (2013.01); *H04W 72/0446* (2013.01); *H04W 74/0841* (2013.01)

(58) Field of Classification Search
CPC .......... H04L 27/2621; H04L 27/2666; H04W 72/0413; H04W 72/0446; H04W 74/0841; H04B 1/7083
See application file for complete search history.

(56) References Cited

U.S. PATENT DOCUMENTS

| | | | | |
|---|---|---|---|---|
| 2018/0035470 | A1* | 2/2018 | Chen | H04W 48/16 |
| 2018/0054800 | A1* | 2/2018 | Yeo | H04L 5/0042 |
| 2018/0070380 | A1* | 3/2018 | Nagaraja | H04B 7/0695 |
| 2018/0198646 | A1* | 7/2018 | Gau | H04L 5/00 |
| 2018/0242367 | A1* | 8/2018 | Kim | H04W 72/04 |
| 2018/0249509 | A1* | 8/2018 | Yi | H04J 11/0069 |
| 2018/0338308 | A1* | 11/2018 | Park | H04W 72/0446 |

FOREIGN PATENT DOCUMENTS

EP 3277042 A1 1/2018

OTHER PUBLICATIONS

Nokia et al., "Remaining details on RACH procedure," 3GPP TSG RAN WG1 Meeting RAN1#92, R1-1802022; Athens, Feb. 16, 2018.

(Continued)

*Primary Examiner* — Rina C Pancholi

(57) ABSTRACT

A User Equipment (UE) for a cellular communications system receives a Random Access Response (RAR) message comprising an indication of a time-domain resource allocation for a Msg3 transmission on a Physical Uplink Shared Channel (PUSCH), and determines a slot offset value, K2, for the Msg3 transmission based on the indication of the time-domain resource allocation and a PUSCH table. UE adds an additional slot offset value for the Msg3 transmission to the slot offset value, K2, to provide an increased slot offset value for the Msg3, and transmits the Msg3 transmission in accordance with the increased slot offset value.

27 Claims, 11 Drawing Sheets

(56) References Cited

OTHER PUBLICATIONS

Ericsson, "Remaining Details in UL Transmission Procedures", 3GPP TSG RAN WG1 AH-1801, R1-1800953; Vancouver, Jan. 22-26, 2018.

Nokia et al., "Summary of Remaining Details on RACH Procedure", 3GPP TSG RAN WG1 #NR1801, R1-1801097; Vancouver, Jan. 22-26, 2018.

Ericsson, DL/UL resources allocation, 3GPP TSG RAN WG1 #92Bis, R1-1805506; Sanya, Apr. 16-20, 2018.

* cited by examiner

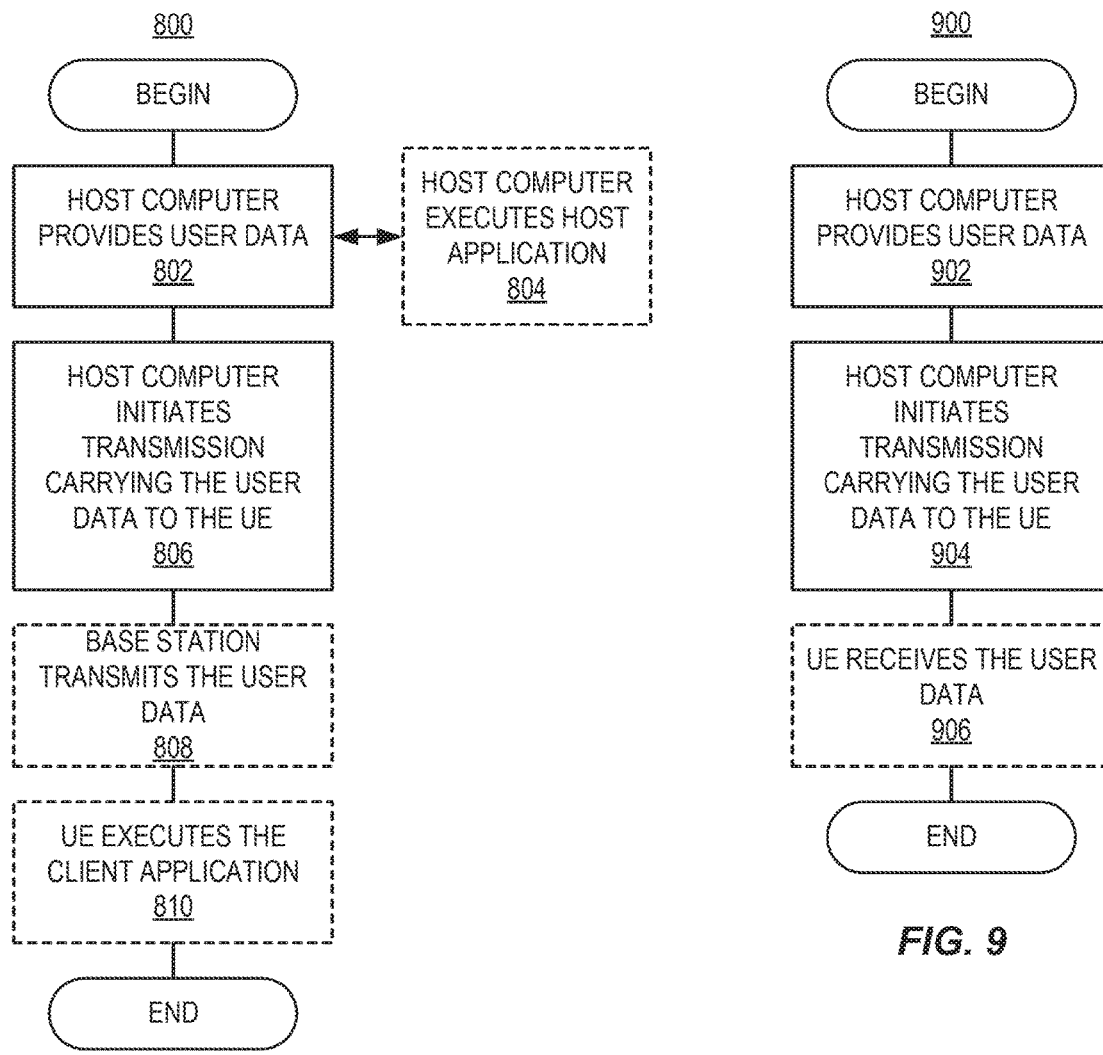

TIME-DOMAIN TABLE FOR PUSCH AND MSG3

CROSS-REFERENCE TO RELATED APPLICATIONS

This application is a continuation of PCT/IB2018/057867 filed on Oct. 10, 2018, which claims the benefit of provisional patent application Ser. No. 62/658,535, filed Apr. 16, 2018, the disclosure of which are hereby incorporated herein by references in their entireties.

TECHNICAL FIELD

The disclosed subject matter relates generally to telecommunications. Certain embodiments relate more particularly to concepts such as control channel design for an initial access procedure.

BACKGROUND

As described in Third Generation Partnership Project (3GPP) Fifth Generation (5G) Technical Specification (TS) 38.214 V15.1.0, for 3GPP New Radio (NR), the Physical Uplink Shared Channel (PUSCH) time-domain resource allocation is indicated in the scheduling Downlink Control Information (DCI). Four (4) bits in the DCI select one time-domain resource allocation entry out of sixteen (16) configured time-domain resource allocation configurations. These sixteen (16) time-domain resource allocation configurations are included in a configured table, which is referred to in 3GPP TS 38.214 V15.1.0 as table pusch-symbolAllocation and more generally referred to herein as a PUSCH table. Each configuration provides a slot offset value (K2) that indicates, relative to the slot in which the DCI is received, the slot or start slot for slot aggregation for which the time-domain resource allocation is valid. In addition, the PUSCH table also provides symbol allocation within the slot and Demodulation Reference Signal (DM-RS) mapping type, where the DM-RS mapping type can either be Type A or Type B. There exists a default PUSCH table that can be overwritten by System Information Block 1 (SIB1). Once a User Equipment (UE) has a dedicated configuration, the UE can receive yet another PUSCH table with dedicated Radio Resource Control (RRC) signaling.

In NR, uplink transmissions are timing advanced. Partly during random access and partly during the time alignment procedure, a UE receives a Timing Advance (TA) value by which the UE should advance its uplink transmission. The TA value received during initial access is relative to the downlink timing, whereas TA values received as part of time alignment procedure are relative to the last uplink transmission. The total TA value applied by the UE is the accumulative sum of all received TA values. TA is needed in an Orthogonal Frequency Division Multiple Access (OFDMA) system to ensure that uplink transmissions from served UEs are time-aligned upon arrival at the base station to maintain orthogonality among UEs.

In NR, the time-domain resource allocation specified in an uplink grant for a PUSCH transmission is specified at the base station (i.e., NR base station (gNB)) timing, i.e. without timing advance. The time-domain resource allocation included in the uplink grant (i.e., slot offset K2 plus start symbol within the slot) specifies the PUSCH start relative to the downlink slot in which the uplink grant is transmitted.

The time at the UE between start of the downlink slot when the uplink grant is received and the time when the uplink transmission starts is given by the indicated time minus the TA value. The UE needs a minimum processing time to decode the uplink grant and prepare the uplink transmission. This time is given in the NR specification and is based on the values in Table 1 below. The parameter µ in the tables below indicates the numerology (µ=1: 15 kilohertz (kHz), µ=2: 30 kHz, µ=3: 60 kHz, µ=4: 120 kHz), which is also referred to as the subcarrier spacing. If uplink and downlink have different numerologies (i.e., different µ values which means different subcarrier spacing), the smaller µ value is used. Based on the PUSCH preparation time ($N_2$) value from the table, the minimum processing time is determined as follows:

$$T_{proc,2}=(N_2+d_{2,1}+d_{2,2})\cdot(2048+144)\cdot\kappa\cdot2^{-\mu UL}\cdot T_c$$

where:

$N_2$: PUSCH preparation time from Table 1

$d_{2,1}$: If the first symbol of the PUSCH allocation consists of DM-RS only, then $d_{2,1}=0$, otherwise $d_{2,1}=1$.

$d_{2,2}$: Accounts for a time difference between component carriers if different component carriers are configured and can have a time difference larger than zero. Otherwise zero.

$\kappa=64$ $T_c=1/(4096\cdot480e3)$

It is up to the base station (i.e., the gNB) to make sure the signaled time-domain resource allocation allows sufficient processing time at the UE after the UE applies the TA value.

TABLE 1

| PUSCH preparation time for PUSCH timing capability 1. Capability 1 refers to the basic processing capability. ||
| --- | --- |
| µ | PUSCH preparation time $N_2$ [symbols] |
| 0 | 10 |
| 1 | 12 |
| 2 | 23 |
| 3 | 36 |

For the first time-aligned PUSCH transmission during the random access procedure, which is referred to as Msg3, the uplink grant is not provided in a DCI (i.e., not provided in a Physical Downlink Control Channel (PDCCH)). Rather, the uplink grant for Msg3 is provided in Msg2 (i.e., the Random Access Response (RAR) message) signaled in a Physical Downlink Shared Channel (PDSCH). It is more complicated to decode PDSCH than PDCCH.

PDSCH timing is based on the values in Table 2 below and determined according to the formula below:

$$T_{proc,1}=(N_1+d_{1,1}+d_{1,2}+d_{1,3})\cdot(2048+144)\cdot\kappa\cdot2^{-\mu DL}\cdot T_c$$

where:

$N_1$: PDSCH processing time from Table 2

$d_{1,1}$: If Acknowledgement/Negative Acknowledgement (ACK/NACK) is transmitted on PUCCH, $d_{1,1}=0$. If ACK/NACK is transmitted on PUSCH, $d_{1,1}=1$.

$d_{1,2}$: Accounts for a time difference between component carriers if different component carriers are configured and can have a time difference larger than zero. Otherwise zero.

$d_{1,3}$: For PDSCH Type A only and ending in the i-th symbol with i<7: $d_{1,3}=7-i$, otherwise $d_{1,3}=0$. This accounts for the fact that a short PDSCH requires a bit more time after it has been finished to finalize decoding than a longer PDSCH.

κ=64

$T_c=1/(4096\cdot480e3)$

TABLE 2

PDSCH processing time for PDSCH processing capability 1. Capability 1 refers to the basic processing capability. It is unclear if NR Rel-15 will also define a more advanced (faster) processing capability.

| | PDSCH decoding time $N_1$ [symbols] | |
| --- | --- | --- |
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

The minimum processing time for Msg3 PUSCH is therefore larger than for a regular PUSCH since the additional processing for PDSCH decoding in Medium Access Control (MAC) and layer 1 needs to be considered. The minimum processing time for Msg3 PUSCH is therefore given by:

$$T_{proc,Msg3}=(N_2+N_1+d_{2,1}+d_{2,2})\cdot(2048+144)\cdot\kappa\cdot2^{-\mu_{UL}}\cdot T_c+0.5 \text{ ms}$$

The value $N_1$ is from Table 2 with additional DM-RS configured. The 0.5 millisecond (ms) is added to account for layer 2 processing.

Thus, there is a need for signaling a time-domain resource allocation for a Msg3 transmission on PUSCH that accounts for the larger processing time needed for decoding of the uplink grant for the Msg3 transmission received on PDSCH.

SUMMARY

Systems and methods for time-domain resource allocation for Msg3 transmission in a random access procedure are disclosed. In some embodiments, a method implemented in a User Equipment (UE) for a cellular communications system comprises receiving a Random Access Response (RAR) message comprising an indication of a time-domain resource allocation for a Msg3 transmission on a Physical Uplink Shared Channel (PUSCH), and determining a slot offset value, K2, for the Msg3 transmission based on the indication of the time-domain resource allocation and a PUSCH table. The method further comprises adding an additional slot offset value for the Msg3 transmission to the slot offset value, K2, to provide an increased slot offset value for the Msg3, and transmitting the Msg3 transmission in accordance with the increased slot offset value. In this manner, the PUSCH table defining time-domain resource allocation configurations for PUSCH transmissions can be reused for Msg3 time-domain resource allocation.

In some embodiments, the additional slot offset value is a function of a subcarrier spacing of the PUSCH.

In some embodiments, the PUSCH table is configured via system information or higher layer signaling.

In some embodiments, the additional slot offset value varies in relation to an additional processing time needed for RAR message decoding compared to Physical Downlink Control Channel (PDCCH) decoding and rounded to a next higher number of slots in an uplink numerology of the PUSCH. In some embodiments, the additional slot offset value is defined in accordance with:

$$\text{additional\_slot\_offset}=\left\lceil\frac{T_{add}}{T_{UL,slot}}\right\rceil\cdot T_{UL,slot}$$

where $T_{add}$ denotes the additional processing time and $T_{UL,slot}$ denotes a duration of an uplink slot for the uplink numerology of the PUSCH, and the increased slot offset value is:

$$K_{2,increased}=K_2+\text{additional\_slot\_offset}$$

where $K_{2,increased}$ denotes the increased slot offset value and $K_2$ denotes the slot offset value, K2, comprised in the time-domain resource allocation.

In some embodiments, the additional slot offset value varies in relation to an additional processing time needed for RAR message decoding compared to PDCCH decoding and rounded to a next lower number of slots in an uplink numerology of the PUSCH.

In some embodiments, the additional processing time, $T_{add}$, is:

$$T_{add}=N_1\cdot(2048+144)\cdot\kappa\cdot2^{-\mu_{UL}}\cdot T_c+0.5 \text{ ms}$$

where $N_1$ is a Physical Downlink Shared Channel (PDSCH) decoding time, κ=64, $\mu_{UL}$ is the uplink numerology of the PUSCH, and $T_c=1/(4096\cdot480e3)$.

In some embodiments, the additional processing time is a function of whether the RAR is transmitted in a short PDSCH with mapping Type A. Note that, as understood by those of skill in the art, a short PDSCH is a PDSCH that stops in the i-th symbol, where i<7.

In some embodiments, the RAR is transmitted in a short PDSCH with mapping Type A that stops in an i-th symbol, and the additional processing time, $T_{add}$, is:

$$T_{add}=(N_1+d_{1,3})\cdot(2048+144)\cdot\kappa\cdot2^{-\mu_{UL}}\cdot T_c+0.5 \text{ ms}$$

where $N_1$ is a PDSCH decoding time, κ=64, $\mu_{UL}$ is the uplink numerology of the PUSCH, $T_c=1/(4096\cdot480e3)$, and $d_{1,3}$ is:

$$d_{1,3}=\begin{cases}7-i & \text{if } i<7 \\ 0 & \text{otherwise}\end{cases}.$$

In some embodiments, the additional processing time, $T_{add}$, is:

$$T_{add}=(N_1+d_{1,3})\cdot(2048+144)\cdot\kappa\cdot2^{-\mu_{UL}}\cdot T_c+0.5 \text{ ms}$$

where $N_1$ is a PDSCH decoding time, κ=64, $\mu_{UL}$ is the uplink numerology of the PUSCH, $T_c=1/(4096\cdot480e3)$, and $d_{1,3}$ is a function of a length of a PDSCH containing the RAR message.

In some embodiments, the UE is configured with two or more cells and a time difference between the cells can be larger than zero, and the additional processing time, $T_{add}$, is:

$$T_{add}=(N_1+d_{1,2})\cdot(2048+144)\cdot\kappa\cdot2^{-\mu_{UL}}\cdot T_c+0.5 \text{ ms}$$

where $N_1$ is a PDSCH decoding time, κ=64, $\mu_{UL}$ is the uplink numerology of the PUSCH, $T_c=1/(4096\cdot480e3)$, and $d_{1,2}$ is a value that accounts to a maximum allowed time difference between cells.

In some embodiments, the UE is configured with two or more cells and a time difference between the cells can be larger than zero, and the additional processing time, $T_{add}$, is:

$$T_{add} = (N_1 + d_{1,2} + d_{1,3}) \cdot (2048 + 144) \cdot \kappa \cdot 2^{-\mu_{UL}} \cdot T_c + 0.5 \text{ ms}$$

where $N_1$ is a PDSCH decoding time, $\kappa=64$, $\mu_{UL}$ is the uplink numerology of the PUSCH, $T_c=1/(4096 \cdot 480\text{e}3)$, $d_{1,2}$ is a value that accounts to a maximum allowed time difference between cells, and $d_{1,3}$ is a function of a length of a PDSCH containing the RAR message.

In some embodiments, receiving the RAR message comprises receiving the RAR message from a base station, and the method further comprises providing user data and forwarding the user data to a host computer via a transmission to the base station.

Embodiments of a UE for a cellular communications system are also disclosed. In some embodiments, a UE for a cellular communication system is adapted to receive a RAR message comprising an indication of a time-domain resource allocation for a Msg3 transmission on a PUSCH, determine a slot offset value, K2, for the Msg3 transmission based on the indication of the time-domain resource allocation and a PUSCH table, add an additional slot offset value for the Msg3 transmission to the slot offset value, K2, to provide an increased slot offset value for the Msg3, and transmit the Msg3 transmission in accordance with the increased slot offset value.

In some embodiments, a UE for a cellular communication system comprises an interface comprising radio front end circuitry and one or more antennas, and processing circuitry associated with the interface, wherein the processing circuitry is operable to cause the UE to receive a RAR message comprising an indication of a time-domain resource allocation for a Msg3 transmission on a PUSCH, determine a slot offset value, K2, for the Msg3 transmission based on the indication of the time-domain resource allocation and a PUSCH table, add an additional slot offset value for the Msg3 transmission to the slot offset value, K2, to provide an increased slot offset value for the Msg3, and transmit the Msg3 transmission in accordance with the increased slot offset value.

In some embodiments, a UE for a cellular communication system comprises a receiving unit operable to receive a RAR message comprising an indication of a time-domain resource allocation for a Msg3 transmission on a PUSCH, an adding unit operable to determine a slot offset value, K2, for the Msg3 transmission based on the indication of the time-domain resource allocation and a PUSCH table and add an additional slot offset value for the Msg3 transmission to the slot offset value, K2, to provide an increased slot offset value for the Msg3, and a communicating unit operable to transmit the Msg3 transmission in accordance with the increased slot offset value.

Embodiments of a method implemented in a base station for a cellular communications system are also disclosed. In some embodiments, a method implemented in a base station for a cellular communications system comprises transmitting a RAR message to a UE, wherein the RAR message comprises an indication of a time-domain resource allocation for a Msg3 transmission on a PUSCH and the time-resource allocation comprises a slot offset value, K2, for the Msg3 transmission on the PUSCH. The method further comprises receiving, from the UE, a Msg3 transmission on the PUSCH in accordance with an increased slot offset value, the increased slot offset value being a sum of the slot offset value and an additional slot offset value for the Msg3 transmission on the PUSCH.

Embodiments of a base station for a cellular communications system are also disclosed. In some embodiments, a base station for a cellular communications system is adapted to transmit a RAR message to a UE, wherein the RAR message comprises an indication of a time-domain resource allocation for a Msg3 transmission on a PUSCH and the time-resource allocation comprises a slot offset value, K2, for the Msg3 transmission on the PUSCH. The base station is further adapted to receive, from the UE, a Msg3 transmission on the PUSCH in accordance with an increased slot offset value, the increased slot offset value being a sum of the slot offset value and an additional slot offset value for the Msg3 transmission on the PUSCH.

In some embodiments, a base station for a cellular communications system comprises processing circuitry operable to cause the base station to transmit a RAR message to a UE, wherein the RAR message comprises an indication of a time-domain resource allocation for a Msg3 transmission on a PUSCH, and the time-resource allocation comprises a slot offset value, K2, for the Msg3 transmission on the PUSCH. The processing circuitry is further operable to cause the base station to receive, from the UE, a Msg3 transmission on the PUSCH in accordance with an increased slot offset value, the increased slot offset value being a sum of the slot offset value and an additional slot offset value for the Msg3 transmission on the PUSCH.

In some embodiments, a base station for a cellular communications system comprises a transmitting unit operable to transmit a RAR message to a UE, wherein the RAR message comprises an indication of a time-domain resource allocation for a Msg3 transmission on a PUSCH, and the time-resource allocation comprises a slot offset value, K2, for the Msg3 transmission on the PUSCH. The base station further comprises a receiving unit operable to receive, from the UE, a Msg3 transmission on the PUSCH in accordance with an increased slot offset value, the increased slot offset value being a sum of the slot offset value and an additional slot offset value for the Msg3 transmission on the PUSCH.

BRIEF DESCRIPTION OF THE DRAWINGS

The drawings illustrate selected embodiments of the disclosed subject matter. In the drawings, like reference labels denote like features.

FIG. 8 illustrates methods implemented in a communication system including a host computer, a base station, and a UE in accordance with some embodiments of the present disclosure;

FIG. 9 illustrates methods implemented in a communication system including a host computer, a base station, and a UE in accordance with some embodiments of the present disclosure;

DETAILED DESCRIPTION

Figure 1:
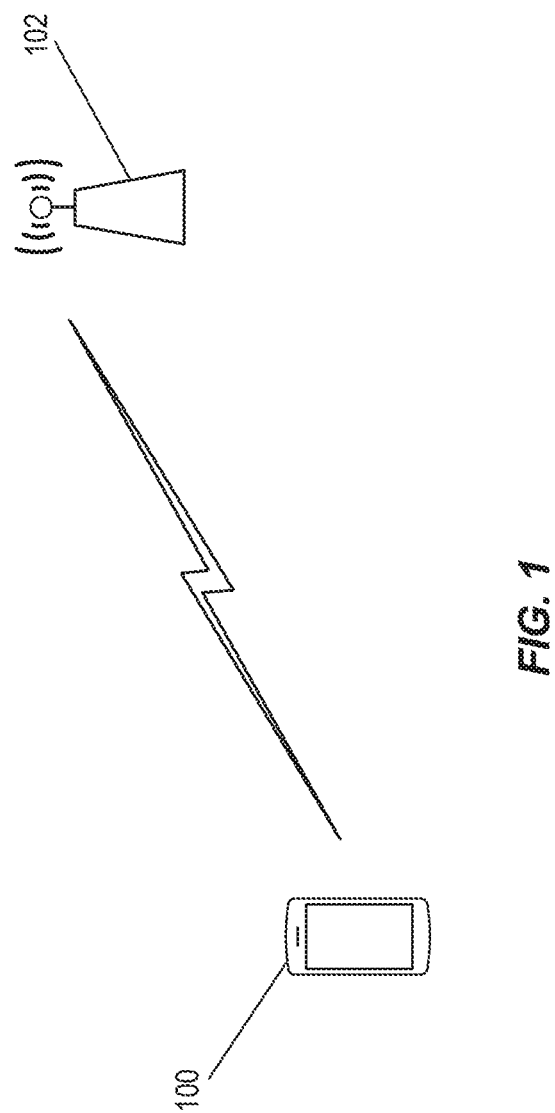
FIG. 1 illustrates a wireless device and a radio access node in accordance with some embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in any document(s) provided in an Appendix hereto.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

Certain concepts may be described herein with reference to particular technology fields or standards and/or using language applicable to those fields or standards. For instance, certain embodiments may be described with reference to cells, subframes/slots, channels, etc. as understood in the context of Long Term Evolution (LTE), or with reference to beams, slots/mini-slots, channels, etc. as understood in the context of Third Generation Partnership Project (3GPP) New Radio (NR). Nevertheless, unless otherwise indicated, the described concepts may be more generally applicable and are not to be limited according to any such field, standard, language, etc.

Systems and methods are disclosed herein for time-domain resource allocation for a Msg3 transmission on a Physical Uplink Shared Channel (PUSCH) that accounts for the larger processing time needed for decoding of a respective uplink grant for the Msg3 transmission received on a Physical Downlink Shared Channel (PDSCH) (i.e., received via a Random Access Response (RAR) message). In certain embodiments of the disclosed subject matter, a regular PUSCH table is used for time-domain resource allocation for Msg3, but, if used to schedule a Msg3 transmission via a Msg2 transmission, an offset is added.

Certain embodiments of the disclosed subject matter are presented in recognition of shortcomings associated with conventional techniques and technologies, such as the following examples. So far it has not been decided if 3GPP Fifth Generation (5G) NR should configure or define a dedicated Msg3 time-domain resource allocation table or if the regular PUSCH table should be reused. Embodiments of the present disclosure enable reuse of the same PUSCH table for both Msg3 time-domain resource allocation and regular PUSCH time-domain resource allocation.

Certain embodiments of the disclosed embodiments may provide potential benefits compared to conventional techniques and technologies, such as the following examples. In certain embodiments just one PUSCH table needs to be configured, thereby reducing signaling overhead.

In some embodiments of the present disclosure, a single time-domain resource allocation table is signaled or configured for PUSCH and Msg3. The time-domain resource allocation table for Msg3, when signaled in Msg2, is derived from the signaled or configured PUSCH table by adding an offset.

In a first embodiment, reuse of the PUSCH table is provided as follows. A default PUSCH table, a System Information Block 1 (SIB1) configured PUSCH table, or a dedicated PUSCH table is reused. However, an offset is added to the slot offset value (i.e., the K2 value) signaled in the time-domain resource allocation to account for the additional processing time. Note, this offset is only added if the time-domain resource allocation is signaled in Msg2 (i.e., a RAR message). The offset varies in relation to the additional processing time needed for Msg2 decoding compared to PDCCH decoding and rounded to the next higher (or, less preferred, lower) number of slots in an uplink numerology $\mu_{UL}$ (i.e., the uplink numerology or subcarrier spacing for the PUSCH on which Msg3 is to be transmitted). If the additional processing time is denoted $T_{add}$, and the time-domain resource allocation in Msg2 signals a K2 value $K_2$, the true K2 (i.e., the increased slot offset value denoted as $K_{2,increased}$) is determined according to (assuming rounding up):

$$K_{2,increased} = K_2 + \left\lceil \frac{T_{add}}{T_{UL,slot}} \right\rceil \cdot T_{UL,slot}$$

where $T_{UL,slot}$ is the duration of an uplink slot. In one example, $T_{add} = N_1 \cdot (2048+144) \cdot \kappa \cdot 2^{-\mu_{UL}} \cdot T_c + 0.5$ ms with $N_1$ taken from Table 2 with additional Demodulation Reference Signal (DM-RS) configured. Other values of $T_{add}$ are proposed in a second embodiment described below.

In a second embodiment, an alternative value of $T_{add}$ is utilized. For a short PDSCH, the decoding time is extended since decoding for a very short PDSCH might extend a bit longer after PDSCH has ended than a longer PDSCH. Therefore, if Msg2 is transmitted in a short PDSCH with mapping Type A, an additional value could be added to $T_{add}$. As an example, it can be considered if PDSCH with mapping Type A stops in the i-th symbol with i<7, an additional term could be added: $d_{1,3}=7-i$ if i<7, otherwise $d_{1,3}=0$, such that $T_{add}$ is:

$$T_{add} = (N_1 + d_{1,3}) \cdot (2048+144) \cdot \kappa \cdot 2^{-\mu_{UL}} \cdot T_c + 0.5 \text{ ms}$$

On the other hand, if PDSCH is very long (either long but still no slot aggregation or PDSCH is transmitted with slot aggregation), PDSCH is finalized later and thus decoding also finalizes later. Since K2 is measured relative to beginning of the first slot where Msg2 is transmitted, another summand $d'_{1,3}$ can be added that increases with PDSCH length. In general, it can be considered to have a $d_{1,3}$ that is a function of the PDSCH (containing Msg2) length.

Another example of another $T_{add}$ is as follows. In case a User Equipment (UE) is configured with multiple cells and the time difference between the cells (either transmit and/or receive) can be larger than 0 and Msg3 is transmitted on a cell (denoted UL2) associated with a cell (denoted DL2) different from a cell (denoted DL1) that is used to send Msg2, it can happen that a timing of DL2 (and thus UL2) is earlier than a timing of DL1 by the maximum allowed time difference. To compensate for this value, a value $d_{1,2}$ can be added to $T_{add}$ which accounts for the maximum time difference. The value $d_{1,2}$ would be larger than zero if a UE is configured (or configured and activated) with multiple cells that can have a time difference larger than zero. It can be considered to make $d_{1,2} > 0$ as soon as a UE is configured (or configured and activated) with multiple cells irrespective which maximum time differences are expected. It can be considered to have in case $d_{1,2} \neq 0$ a fixed value or a value that depends on the actual or actually expected maximum time difference. Thus, in this example, $T_{add}$ is:

$$T_{add} = (N_1 + d_{1,2}) \cdot (2048 + 144) \cdot \kappa \cdot 2^{-\mu_{UL}} \cdot T_c + 0.5 \text{ ms}$$

Combining $d_{1,2}$ and $d_{1,3}$ can also be considered such that $T_{add}$ is:

$$T_{add} = (N_1 + d_{1,2} + d_{1,3}) \cdot (2048 + 144) \cdot \kappa \cdot 2^{-\mu_{UL}} \cdot T_c + 0.5 \text{ ms}$$

FIG. 1 illustrates a wireless device 100 (also referred to herein as a UE 100) and a radio access node 102 (e.g., a base station such as, e.g., a NR base station (gNB)) that operate to provide time-domain resource allocation for Msg3 in accordance with at least some aspects of the embodiments described herein. The radio access node 102 is preferably a base station in a cellular network (also referred to herein as a cellular communications network or cellular communications system). The wireless device 100 and the radio access node 102 wirelessly communicate, e.g. in accordance with a cellular network standard such as, for example, a 3GPP 5G NR standard.

Figure 2:
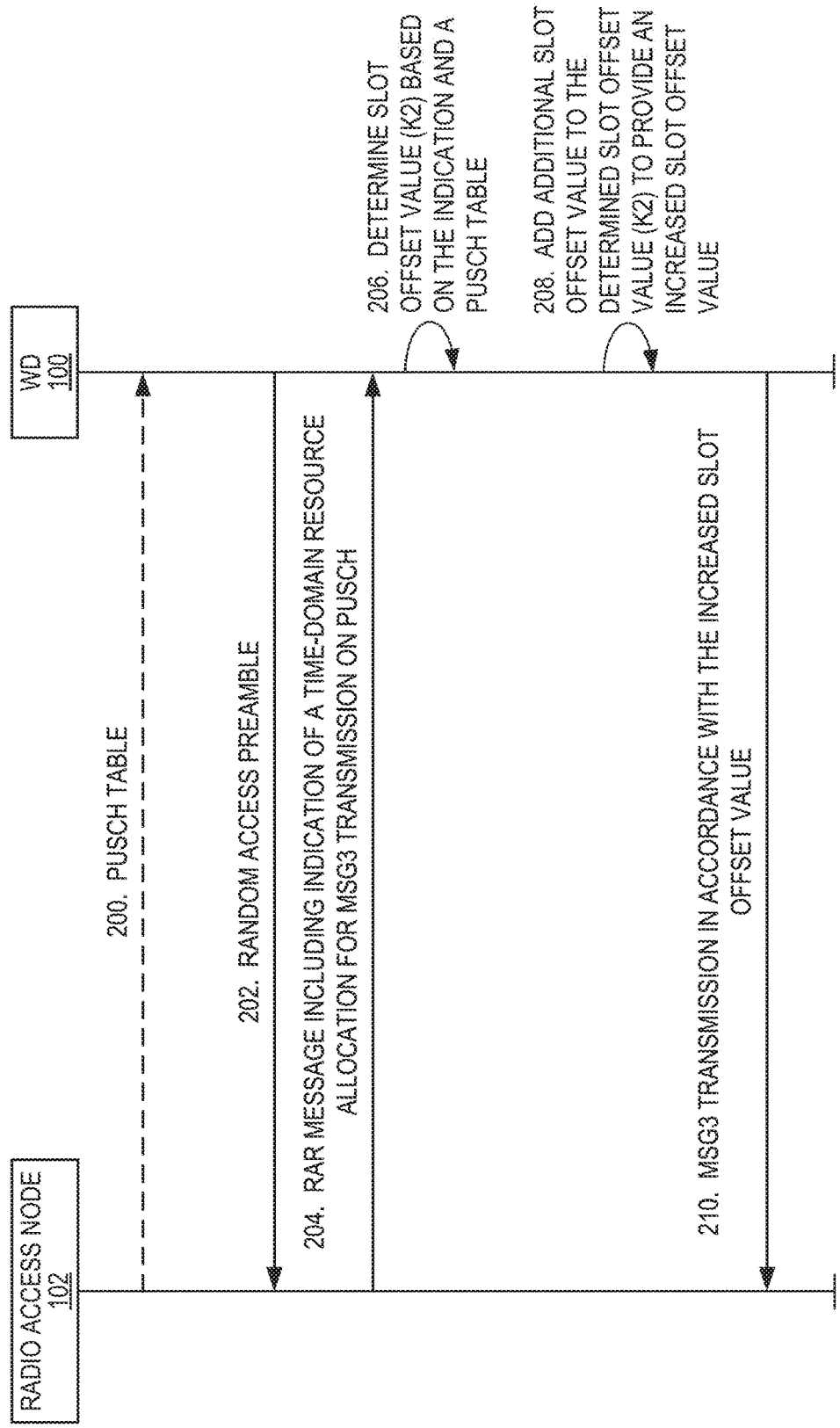
FIG. 2 illustrates the operation of the wireless device and the radio access node of FIG. 1 in accordance with some embodiments of the present disclosure.

FIG. 2 illustrates the operation of the wireless device 100 and the radio access node 102 in accordance with some embodiments of the present disclosure. Optional steps are represented by dashed lines. Optionally, in some embodiments, the radio access node 102 configures a PUSCH table for the wireless device 100 (step 200). The PUSCH table may be configured via system information (e.g., SIB1) or higher layer signaling. The PUSCH table includes multiple time-domain resource allocation configurations.

For random access, the wireless device 100 transmits a random access preamble (step 202). Upon receiving the random access preamble, the radio access node 102 transmits a RAR message to the wireless device 100, where the RAR message includes an indication of a time-domain resource allocation for a Msg3 transmission on a PUSCH (step 204). The wireless device 100 receives the RAR message and determines a slot offset value (K2) for the Msg3 transmission based on the indication of the time-domain resource allocation and a PUSCH table (step 206). The PUSCH table may be a default PUSCH table or a configured PUSCH table (e.g., the PUSCH table configured in step 200). The wireless device 100 adds an additional slot offset value to the slot offset value (K2) comprised in the time-domain resource allocation to thereby provide an increased slot offset value for the Msg3 transmission (step 208). The additional slot offset value, which is sometimes referred to herein as "offset," can be determined as described above with respect to either the first embodiment or the second embodiment. The wireless device 100 then transmits the Msg3 transmission in accordance with the increased slot offset value (step 210).

Figure 3:
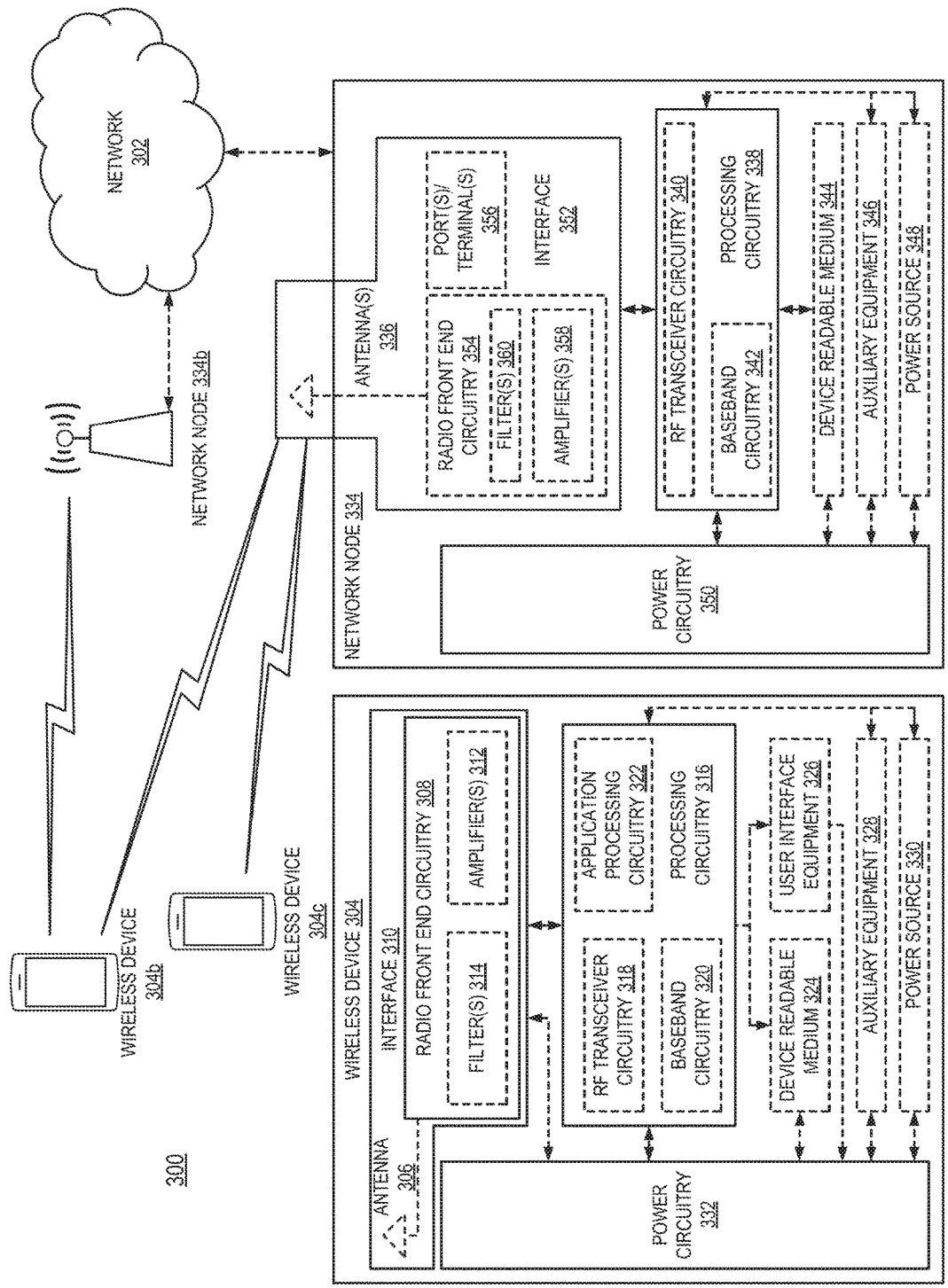
FIG. 3 illustrates a wireless network in accordance with some embodiments of the present disclosure.

While embodiments of the present disclosure may be implemented in any suitable type of wireless network, FIG. 3 illustrates one example of a wireless network 300 in which embodiments of the present disclosure may be implemented. FIG. 3 illustrates a wireless network 300 in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts a network 302, network nodes 334 and 334b, and Wireless Devices (WDs) 110, 110b, and 304c. The WDs 304, 304b, and 304c are examples of the wireless device 100 of FIG. 1. In practice, a wireless network may further include any additional elements suitable to support communication between wireless devices or between a wireless device and another communication device, such as a landline telephone, a service provider, or any other network node or end device. Of the illustrated components, the network node 334 and the WD 304 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures.

The network 302 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 334 and the WD 304 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, enhanced or evolved Node Bs (eNBs), and NR Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such remote radio units may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self Optimized Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, the network node 334 includes processing circuitry 338, a device readable medium 344, an interface 352, auxiliary equipment 346, a power source 348, power circuitry 350, and an antenna 336. Although the network node 334 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 334 are depicted as single boxes located within a larger box, or nested within multiple boxes, in practice, a network node may comprise multiple different physical components that make up a single illustrated component (e.g., the device readable medium 344 may comprise multiple separate hard drives as well as multiple Random Access Memory (RAM) modules).

Similarly, the network node 334 may be composed of multiple physically separate components (e.g., a Node B component and an RNC component, or a BTS component and a BSC component, etc.), which may each have their own respective components. In certain scenarios in which the network node 334 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 334 may be configured to support multiple Radio Access Technologies (RATs). In such embodiments, some components may be duplicated (e.g., a separate device readable medium 344 for the different RATs) and some components may be reused (e.g., the same antenna 336 may be shared by the RATs). The network node 334 may also include multiple sets of the various illustrated components for different wireless technologies integrated into the network node 334, such as, for example, GSM, Wideband Code Division Multiple Access (WCDMA), LTE, NR, WiFi, or Bluetooth wireless technologies. These wireless technologies may be integrated into the same or different chips or set of chips and other components within the network node 334.

The processing circuitry 338 is configured to perform any determining, calculating, or similar operations (e.g., certain obtaining operations) described herein as being provided by a network node. These operations performed by the processing circuitry 338 may include processing information obtained by the processing circuitry 338 by, for example, converting the obtained information into other information, comparing the obtained information or converted information to information stored in the network node 334, and/or performing one or more operations based on the obtained information or converted information, and as a result of said processing making a determination.

The processing circuitry 338 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software, and/or encoded logic operable to provide, either alone or in conjunction with other network node 334 components, such as the device readable medium 344, network node 334 functionality. For example, the processing circuitry 338 may execute instructions stored in the device readable medium 344 or in memory within the processing circuitry 338. Such functionality may include providing any of the various wireless features, functions, or benefits discussed herein. In some embodiments, the processing circuitry 338 may include a System on a Chip (SOC).

In some embodiments, the processing circuitry 338 may include one or more of Radio Frequency (RF) transceiver circuitry 340 and baseband processing circuitry 342. In some embodiments, the RF transceiver circuitry 340 and the baseband processing circuitry 342 may be on separate chips (or sets of chips), boards, or units, such as radio units and digital units. In alternative embodiments, part or all of the RF transceiver circuitry 340 and the baseband processing circuitry 342 may be on the same chip or set of chips, boards, or units.

In certain embodiments, some or all of the functionality described herein as being provided by a network node, base station, eNB, or other such network device may be performed by the processing circuitry 338 executing instructions stored on the device readable medium 344 or memory within the processing circuitry 338. In alternative embodiments, some or all of the functionality may be provided by the processing circuitry 338 without executing instructions stored on a separate or discrete device readable medium, such as in a hard-wired manner. In any of those embodiments, whether executing instructions stored on a device readable storage medium or not, the processing circuitry 338 can be configured to perform the described functionality. The benefits provided by such functionality are not limited to the processing circuitry 338 alone or to other components of the network node 334, but are enjoyed by the network node 334 as a whole, and/or by end users and the wireless network generally.

The device readable medium 344 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable, and/or computer-executable memory devices that store information, data, and/or instructions that may be used by the processing circuitry 338. The device readable medium 344 may store any suitable instructions, data, or information, including a computer program, software, an application including one or more of logic, rules, code, tables, etc., and/or other instructions capable of being executed by the processing circuitry 338 and utilized by the network node 334. The device readable medium 344 may be used to store any calculations made by the processing circuitry 338 and/or any data received via the interface 352. In some embodiments, the processing circuitry 338 and the device readable medium 344 may be considered to be integrated.

The interface 352 is used in the wired or wireless communication of signaling and/or data between the network node 334, the network 302, and/or the WDs 304. As illustrated, the interface 352 comprises port(s)/terminal(s) 194 to send and receive data, for example to and from the network 302 over a wired connection. The interface 352 also includes radio front end circuitry 354 that may be coupled to, or in certain embodiments a part of, the antenna 336. The radio front end circuitry 354 comprises filters 360 and amplifiers 358. The radio front end circuitry 354 may be connected to the antenna 336 and the processing circuitry 338. The radio front end circuitry 354 may be configured to condition signals communicated between the antenna 336 and the processing circuitry 338. The radio front end circuitry 354 may receive digital data that is to be sent out to other network nodes or WDs via a wireless connection. The radio front end circuitry 354 may convert the digital data into a radio signal having the appropriate channel and bandwidth parameters using a combination of the filters 360 and/or the amplifiers 358. The radio signal may then be transmitted via the antenna 336. Similarly, when receiving data, the antenna 336 may collect radio signals which are then converted into digital data by the radio front end circuitry 354. The digital data may be passed to the processing circuitry 338. In other embodiments, the interface 352 may comprise different components and/or different combinations of components.

In certain alternative embodiments, the network node 334 may not include separate radio front end circuitry 354, instead, the processing circuitry 338 may comprise radio front end circuitry and may be connected to the antenna 336 without separate radio front end circuitry 354. Similarly, in some embodiments, all or some of the RF transceiver circuitry 340 may be considered a part of the interface 352. In still other embodiments, the interface 352 may include the one or more ports or terminals 356, the radio front end circuitry 354, and the RF transceiver circuitry 340, as part of a radio unit (not shown), and the interface 352 may communicate with the baseband processing circuitry 342, which is part of a digital unit (not shown).

The antenna 336 may include one or more antennas, or antenna arrays, configured to send and/or receive wireless signals. The antenna 336 may be coupled to the radio front end circuitry 354 and may be any type of antenna capable of transmitting and receiving data and/or signals wirelessly. In some embodiments, the antenna 336 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 336 may be separate from the network node 334 and may be connectable to the network node 334 through an interface or port.

The antenna 336, the interface 352, and/or the processing circuitry 338 may be configured to perform any receiving operations and/or certain obtaining operations described herein as being performed by a network node. Any information, data, and/or signals may be received from a wireless device, another network node, and/or any other network equipment. Similarly, the antenna 336, the interface 352, and/or the processing circuitry 338 may be configured to perform any transmitting operations described herein as being performed by a network node. Any information, data, and/or signals may be transmitted to a wireless device, another network node, and/or any other network equipment.

The power circuitry 350 may comprise, or be coupled to, power management circuitry and is configured to supply the components of the network node 334 with power for performing the functionality described herein. The power circuitry 350 may receive power from the power source 348. The power source 348 and/or the power circuitry 350 may be configured to provide power to the various components of the network node 334 in a form suitable for the respective components (e.g., at a voltage and current level needed for each respective component). The power source 348 may either be included in, or external to, the power circuitry 350 and/or the network node 334. For example, the network node 334 may be connectable to an external power source (e.g., an electricity outlet) via an input circuitry or interface such as an electrical cable, whereby the external power source supplies power to the power circuitry 350. As a further example, the power source 348 may comprise a source of power in the form of a battery or battery pack which is connected to, or integrated in, the power circuitry 350. The battery may provide backup power should the external power source fail. Other types of power sources, such as photovoltaic devices, may also be used.

Alternative embodiments of the network node 334 may include additional components beyond those shown in FIG. 3 that may be responsible for providing certain aspects of the network node's functionality, including any of the functionality described herein and/or any functionality necessary to support the subject matter described herein. For example, the network node 334 may include user interface equipment to allow input of information into the network node 334 and to allow output of information from the network node 334. This may allow a user to perform diagnostic, maintenance, repair, and other administrative functions for the network node 334.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle-mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-To-Machine (M2M) device, which may in a 3GPP context be referred to as a Machine Type Communication (MTC) device. As one particular example, the WD may be a UE implementing the 3GPP narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, the wireless device 304 includes an antenna 306, an interface 310, processing circuitry 316, a device readable medium 324, user interface equipment 326, auxiliary equipment 328, a power source 330, and power circuitry 332. The WD 304 may include multiple sets of one or more of the illustrated components for different wireless technologies supported by the WD 304, such as, for example, GSM, WCDMA, LTE, NR, WiFi, WiMAX, or Bluetooth wireless technologies, just to mention a few. These wireless technologies may be integrated into the same or different chips or set of chips as other components within the WD 304.

The antenna 306 may include one or more antennas or antenna arrays configured to send and/or receive wireless signals, and is connected to the interface 310. In certain alternative embodiments, the antenna 306 may be separate from the WD 304 and be connectable to the WD 304 through an interface or port. The antenna 306, the interface 310, and/or the processing circuitry 316 may be configured to perform any receiving or transmitting operations described herein as being performed by a WD. Any information, data, and/or signals may be received from a network node and/or another WD. In some embodiments, radio front end circuitry and/or the antenna 306 may be considered an interface.

As illustrated, the interface 310 comprises radio front end circuitry 308 and the antenna 306. The radio front end circuitry 308 comprises one or more filters 314 and amplifiers 312. The radio front end circuitry 310 is connected to the antenna 306 and the processing circuitry 316, and is configured to condition signals communicated between the antenna 306 and the processing circuitry 316. The radio front end circuitry 308 may be coupled to or a part of the antenna 306. In some embodiments, the WD 304 may not include separate radio front end circuitry 308; rather, the processing circuitry 316 may comprise radio front end circuitry and may be connected to the antenna 306. Similarly, in some embodiments, some or all of RF transceiver circuitry 318 may be considered a part of the interface 310. The radio front end circuitry 308 may receive digital data that is to be sent out to other network nodes or WDs via a wireless connection. The radio front end circuitry 308 may convert the digital data into a radio signal having the appropriate channel and bandwidth parameters using a combination of the filters 314 and/or the amplifiers 312. The radio signal may then be transmitted via the antenna 306. Similarly, when receiving data, the antenna 306 may collect radio signals which are then converted into digital data by the radio front end circuitry 308. The digital data may be passed to the processing circuitry 316. In other embodiments, the interface 310 may comprise different components and/or different combinations of components.

The processing circuitry 316 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 304 components, such as the device readable medium 324, WD 304 functionality. Such functionality may include providing any of the various wireless features or benefits discussed herein. For example, the processing circuitry 316 may execute instructions stored in the device readable medium 324 or in memory within the processing circuitry 316 to provide the functionality disclosed herein.

As illustrated, the processing circuitry 316 includes one or more of RF transceiver circuitry 318, baseband processing circuitry 320, and application processing circuitry 322. In other embodiments, the processing circuitry 316 may comprise different components and/or different combinations of components. In certain embodiments the processing circuitry 316 of the WD 304 may comprise a SOC. In some embodiments, the RF transceiver circuitry 318, the baseband processing circuitry 320, and the application processing circuitry 322 may be on separate chips or sets of chips. In alternative embodiments, part or all of the baseband processing circuitry 320 and the application processing circuitry 322 may be combined into one chip or set of chips, and the RF transceiver circuitry 318 may be on a separate chip or set of chips. In still alternative embodiments, part or all of the RF transceiver circuitry 318 and the baseband processing circuitry 320 may be on the same chip or set of chips, and the application processing circuitry 322 may be on a separate chip or set of chips. In yet other alternative embodiments, part or all of the RF transceiver circuitry 318, the baseband processing circuitry 320, and the application processing circuitry 322 may be combined in the same chip or set of chips. In some embodiments, the RF transceiver circuitry 318 may be a part of the interface 310. The RF transceiver circuitry 318 may condition RF signals for the processing circuitry 316.

In certain embodiments, some or all of the functionality described herein as being performed by a WD may be provided by the processing circuitry 316 executing instructions stored on the device readable medium 324, which in certain embodiments may be a computer-readable storage medium. In alternative embodiments, some or all of the functionality may be provided by the processing circuitry 316 without executing instructions stored on a separate or discrete device readable storage medium, such as in a hard-wired manner. In any of those particular embodiments, whether executing instructions stored on a device readable storage medium or not, the processing circuitry 316 can be configured to perform the described functionality. The benefits provided by such functionality are not limited to the processing circuitry 316 alone or to other components of the WD 304, but are enjoyed by the WD 304 as a whole, and/or by end users and the wireless network generally.

The processing circuitry 316 may be configured to perform any determining, calculating, or similar operations (e.g., certain obtaining operations) described herein as being performed by a WD. These operations, as performed by the processing circuitry 316, may include processing information obtained by the processing circuitry 316 by, for example, converting the obtained information into other information, comparing the obtained information or converted information to information stored by the WD 304, and/or performing one or more operations based on the obtained information or converted information, and as a result of said processing making a determination.

The device readable medium 324 may be operable to store a computer program, software, an application including one or more of logic, rules, code, tables, etc., and/or other instructions capable of being executed by the processing circuitry 316. The device readable medium 324 may include computer memory (e.g., RAM or ROM), mass storage media (e.g., a hard disk), removable storage media (e.g., a CD or a DVD), and/or any other volatile or non-volatile, non-transitory device readable, and/or computer executable memory devices that store information, data, and/or instructions that may be used by the processing circuitry 316. In some embodiments, the processing circuitry 316 and the device readable medium 324 may be considered to be integrated.

The user interface equipment 326 may provide components that allow for a human user to interact with the WD 304. Such interaction may be of many forms, such as visual, audial, tactile, etc. The user interface equipment 326 may be operable to produce output to the user and to allow the user to provide input to the WD 304. The type of interaction may vary depending on the type of user interface equipment 326 installed in the WD 304. For example, if the WD 304 is a smart phone, the interaction may be via a touch screen; if the WD 304 is a smart meter, the interaction may be through a screen that provides usage (e.g., the number of gallons used) or a speaker that provides an audible alert (e.g., if smoke is detected). The user interface equipment 326 may include input interfaces, devices and circuits, and output interfaces, devices and circuits. The user interface equipment 326 is configured to allow input of information into the WD 304, and is connected to the processing circuitry 316 to allow the processing circuitry 316 to process the input information. The user interface equipment 326 may include, for example, a microphone, a proximity or other sensor, keys/buttons, a touch display, one or more cameras, a Universal Serial Bus (USB) port, or other input circuitry. The user interface equipment 326 is also configured to allow output of information from the WD 304, and to allow the processing circuitry 316 to output information from the WD 304. The user interface equipment 326 may include, for example, a speaker, a display, vibrating circuitry, a USB port, a headphone interface, or other output circuitry. Using one or more input and output interfaces, devices, and circuits of the user interface equipment 326, the WD 304 may communicate with end users and/or the wireless network and allow them to benefit from the functionality described herein.

The auxiliary equipment 328 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 328 may vary depending on the embodiment and/or scenario.

The power source 330 may, in some embodiments, be in the form of a battery or battery pack. Other types of power sources, such as an external power source (e.g., an electricity outlet), photovoltaic devices, or power cells, may also be used. The WD 304 may further comprise the power circuitry 332 for delivering power from the power source 330 to the various parts of the WD 304 which need power from the power source 330 to carry out any functionality described or indicated herein. The power circuitry 332 may in certain embodiments comprise power management circuitry. The power circuitry 332 may additionally or alternatively be operable to receive power from an external power source; in which case the WD 304 may be connectable to the external power source (such as an electricity outlet) via input circuitry or an interface such as an electrical power cable. The power circuitry 332 may also in certain embodiments be operable to deliver power from an external power source to the power source 330. This may be, for example, for the charging of the power source 330. The power circuitry 332 may perform any formatting, converting, or other modification to the power from the power source 330 to make the power suitable for the respective components of the WD 304 to which power is supplied.

Figure 4:
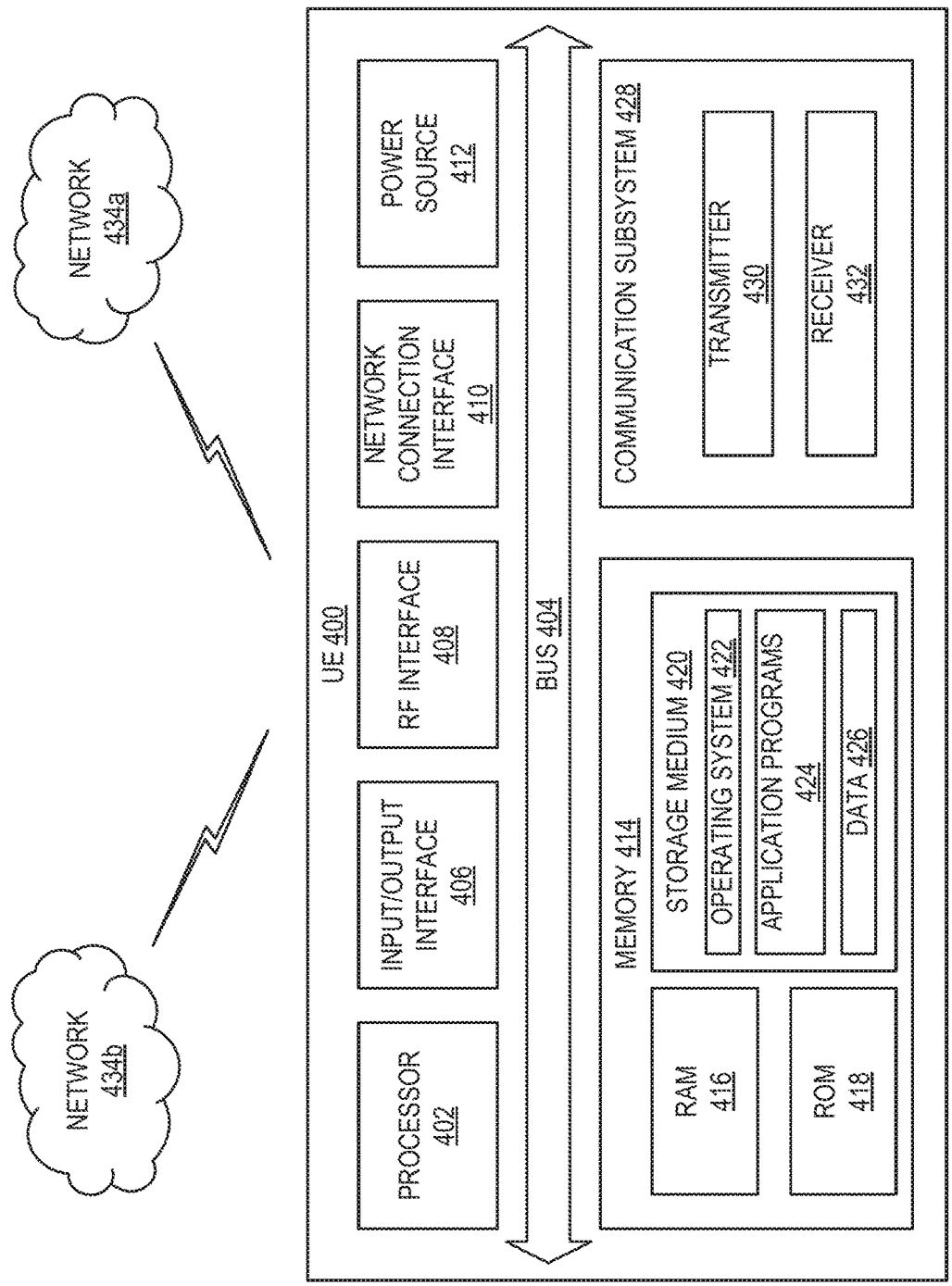
FIG. 4 illustrates a User Equipment (UE) in accordance with some embodiments of the present disclosure.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 400 may be any UE identified by the 3GPP, including a NB-IoT UE, a MTC UE, and/or an enhanced MTC (eMTC) UE. The UE 400, as illustrated in FIG. 4, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 4 is a UE, the components discussed herein are equally applicable to a WD, and vice-versa. The UE 400 of FIG. 4 is one example of the wireless device 100 described above.

In FIG. 4, the UE 400 includes processing circuitry 402 that is operatively coupled to an input/output interface 406, an RF interface 408, a network connection interface 410, memory 414 including RAM 416, ROM 418, and a storage medium 420 or the like, a communication subsystem 428, a power source 412, and/or any other component, or any combination thereof. The storage medium 420 includes an operating system 422, an application program 424, and data 426. In other embodiments, the storage medium 420 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, the processing circuitry 402 may be configured to process computer instructions and data. The processing circuitry 402 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 402 may include two CPUs. Data may be information in a form suitable for use by a computer.

In the depicted embodiment, the input/output interface 406 may be configured to provide a communication interface to an input device, output device, or input and output device. The UE 400 may be configured to use an output device via the input/output interface 406. An output device may use the same type of interface port as an input device. For example, a USB port may be used to provide input to and output from the UE 400. The output device may be a speaker, a sound card, a video card, a display, a monitor, a printer, an actuator, an emitter, a smartcard, another output device, or any combination thereof. The UE 400 may be configured to use an input device via the input/output interface 406 to allow a user to capture information into the UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, the RF interface 408 may be configured to provide a communication interface to RF components such as a transmitter, a receiver, and an antenna. The network connection interface 410 may be configured to provide a communication interface to a network 434*a*. The network 434*a* may encompass wired and/or wireless networks such as a LAN, a WAN, a computer network, a wireless network, a telecommunications network, another like network, or any combination thereof. For example, the network 434*a* may comprise a WiFi network. The network connection interface 410 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 410 may implement receiver and transmitter functionality appropriate to the communication network links (e.g., optical, electrical, and the like). The transmitter and receiver functions may share circuit components, software, or firmware, or alternatively may be implemented separately.

The RAM 416 may be configured to interface via a bus 404 to the processing circuitry 402 to provide storage or caching of data or computer instructions during the execution of software programs such as the operating system, application programs, and device drivers. The ROM 418 may be configured to provide computer instructions or data to the processing circuitry 402. For example, the ROM 418 may be configured to store invariant low-level system code or data for basic system functions such as basic Input and Output (I/O), startup, or reception of keystrokes from a keyboard that are stored in a non-volatile memory. The storage medium 420 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 420 may be configured to include an operating system 422, an application program 424 such as a web browser application, a widget or gadget engine or another application, and a data file 426. The storage medium 420 may store, for use by the UE 400, any of a variety of various operating systems or combinations of operating systems.

The storage medium 420 may be configured to include a number of physical drive units, such as a Redundant Array Of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 420 may allow the UE 400 to access computer-executable instructions, application programs, or the like, stored on transitory or non-transitory memory media, to off-load data, or to upload data. An article of manufacture, such as one utilizing a communication system may be tangibly embodied in the storage medium 420, which may comprise a device readable medium.

In FIG. 4, the processing circuitry 402 may be configured to communicate with a network 434*b* using the communication subsystem 428. The network 434*a* and the network 434*b* may be the same network or networks or different network or networks. The communication subsystem 428 may be configured to include one or more transceivers used to communicate with the network 434*b*. For example, the communication subsystem 428 may be configured to include one or more transceivers used to communicate with one or more remote transceivers of another device capable of wireless communication such as another WD, UE, or base station of a Radio Access Network (RAN) according to one or more communication protocols, such as IEEE 802.2, Code Division Multiple Access (CDMA), WCDMA, GSM, LTE, Universal Terrestrial RAN (UTRAN), WiMax, or the like. Each transceiver may include a transmitter 430 and/or a receiver 432 to implement transmitter or receiver functionality, respectively, appropriate to the RAN links (e.g., frequency allocations and the like). Further, the transmitter 430 and the receiver 432 of each transceiver may share circuit components, software, or firmware, or alternatively may be implemented separately.

In the illustrated embodiment, the communication functions of the communication subsystem 428 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 428 may include cellular communication, WiFi communication, Bluetooth communication, and GPS communication. The network 434b may encompass wired and/or wireless networks such as a LAN, a WAN, a computer network, a wireless network, a telecommunications network, another like network or any combination thereof. For example, the network 434b may be a cellular network, a WiFi network, and/or a near-field network. The power source 412 may be configured to provide Alternating Current (AC) or Direct Current (DC) power to components of the UE 400.

The features, benefits, and/or functions described herein may be implemented in one of the components of the UE 400 or partitioned across multiple components of the UE 400. Further, the features, benefits, and/or functions described herein may be implemented in any combination of hardware, software, or firmware. In one example, the communication subsystem 428 may be configured to include any of the components described herein. Further, the processing circuitry 402 may be configured to communicate with any of such components over the bus 404. In another example, any of such components may be represented by program instructions stored in memory that, when executed by the processing circuitry 402, perform the corresponding functions described herein. In another example, the functionality of any of such components may be partitioned between the processing circuitry 402 and the communication subsystem 428. In another example, the non-computationally intensive functions of any of such components may be implemented in software or firmware and the computationally intensive functions may be implemented in hardware.

Figure 5:
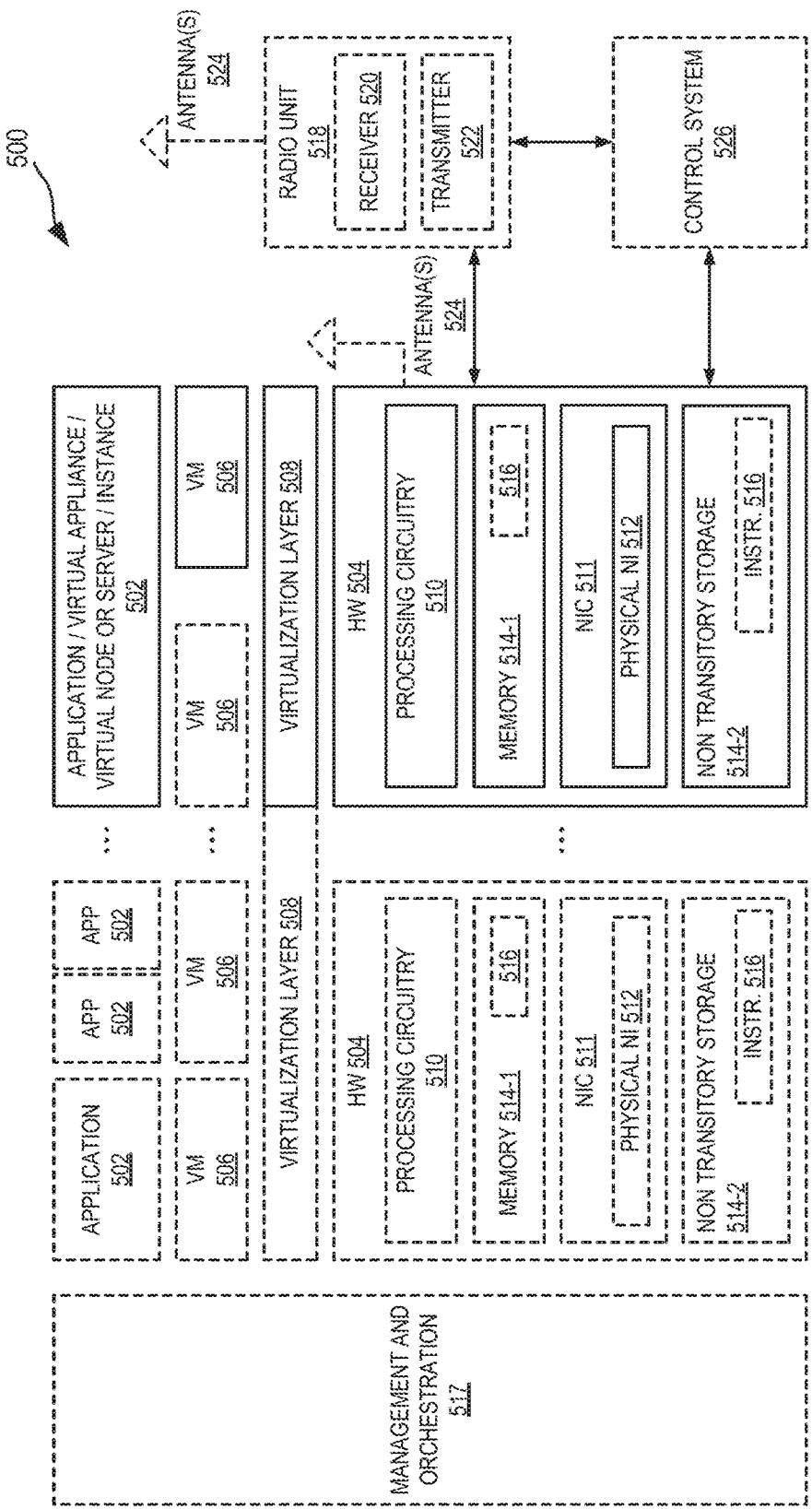
FIG. 5 illustrates a virtualization environment in accordance with some embodiments of the present disclosure.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 500 hosted by one or more hardware nodes 504. Further, in embodiments in which the virtual node is not a radio access node or does not require radio connectivity (e.g., a core network node), then the network node may be entirely virtualized.

The functions may be implemented by one or more applications 502 (which may alternatively be called software instances, virtual appliances, network functions, virtual nodes, virtual network functions, etc.) operative to implement some of the features, functions, and/or benefits of some of the embodiments disclosed herein. The applications 502 are run in the virtualization environment 500 which provides the hardware 504 comprising processing circuitry 510 and memory 514. The memory 514 contains instructions 516 executable by the processing circuitry 510 whereby the application 502 is operative to provide one or more of the features, benefits, and/or functions disclosed herein.

The virtualization environment 500 comprises general-purpose or special-purpose network hardware devices 504 comprising a set of one or more processors or processing circuitry 510, which may be Commercial Off-The-Shelf (COTS) processors, dedicated ASICs, or any other type of processing circuitry including digital or analog hardware components or special purpose processors. Each hardware device 504 may comprise memory 514-1 which may be non-persistent memory for temporarily storing instructions 516 or software executed by the processing circuitry 510. Each hardware device 504 may comprise one or more Network Interface Controllers (NICs) 511, also known as network interface cards, which include a physical network interface 512. Each hardware device 504 may also include non-transitory, persistent, machine-readable storage media 514-2 having stored therein software 516 and/or instructions executable by the processing circuitry 510. The software 516 may include any type of software including software for instantiating one or more virtualization layers 508 (also referred to as hypervisors), software to execute virtual machines 506, as well as software allowing it to execute functions, features, and/or benefits described in relation with some embodiments described herein.

The virtual machines 506 comprise virtual processing, virtual memory, virtual networking or interface, and virtual storage, and may be run by a corresponding virtualization layer 508 or hypervisor. Different embodiments of the instance of the virtual appliance 502 may be implemented on one or more of the virtual machines 506, and the implementations may be made in different ways.

During operation, the processing circuitry 510 executes the software 516 to instantiate the hypervisor or virtualization layer 508, which may sometimes be referred to as a Virtual Machine Monitor (VMM). The virtualization layer 508 may present a virtual operating platform that appears like networking hardware to the virtual machine 506.

As shown in FIG. 5, the hardware 504 may be a stand-alone network node with generic or specific components. The hardware 504 may comprise an antenna 524 and may implement some functions via virtualization. Alternatively, the hardware 504 may be part of a larger cluster of hardware (e.g., such as in a data center or CPE) where many hardware nodes work together and are managed via a Management and Orchestration (MANO) 517, which, among others, oversees lifecycle management of the applications 502.

Virtualization of the hardware 504 is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 506 may be a software implementation of a physical machine that runs programs as if they were executing on a physical, non-virtualized machine. Each of virtual machines 506, and that part of the hardware 504 that executes that virtual machine, be it hardware dedicated to that virtual machine and/or hardware shared by that virtual machine with others of the virtual machines 506, forms a separate Virtual Network Element (VNE).

Still in the context of NFV, Virtual Network Function (VNF) is responsible for handling specific network functions that run in one or more virtual machines 506 on top of the hardware 504 networking infrastructure and corresponds to the application 502 in FIG. 5.

In some embodiments, one or more radio units 518 that each include one or more transmitters 522 and one or more receivers 520 may be coupled to the one or more antennas 524. The radio units 518 may communicate directly with the hardware nodes 504 via one or more appropriate network interfaces and may be used in combination with the virtual components to provide a virtual node with radio capabilities, such as a radio access node or a base station.

In some embodiments, some signaling can be effected with the use of a control system 526 which may alternatively be used for communication between the hardware nodes 504 and the radio units 518.

Figure 6:
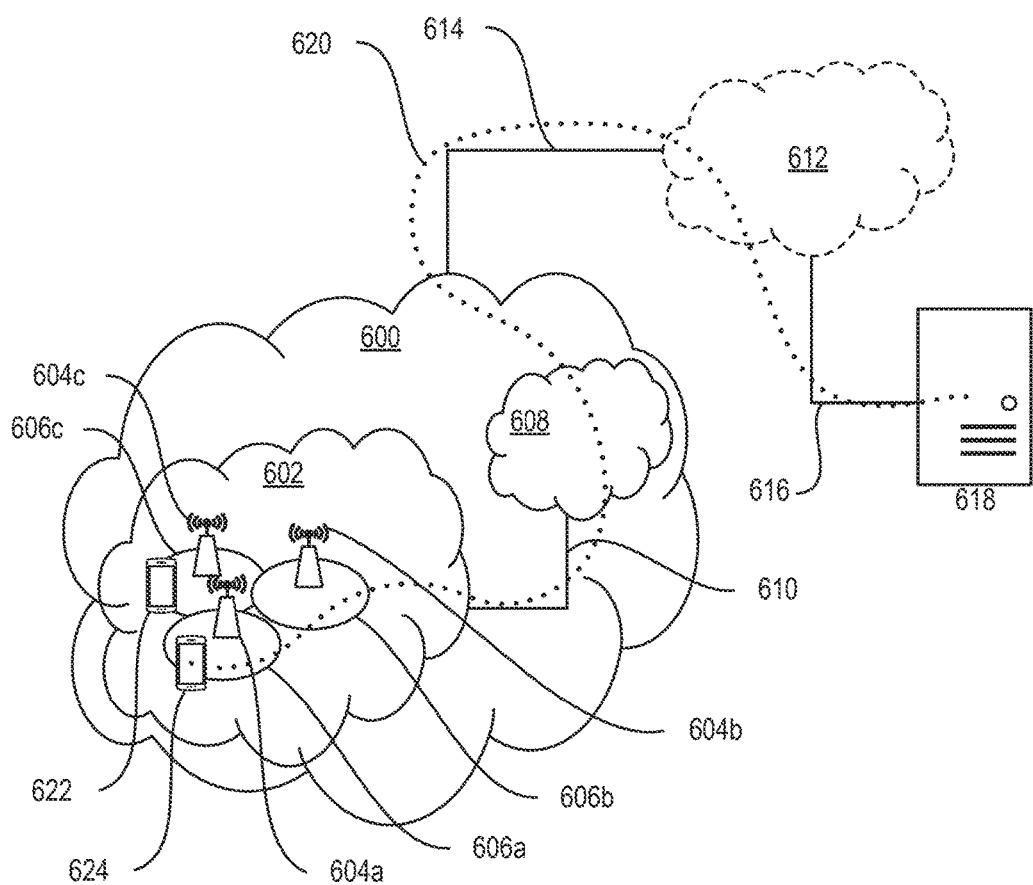
FIG. 6 illustrates a telecommunication network connected via an intermediate network to a host computer in accordance with some embodiments of the present disclosure.

FIG. 6 illustrates a telecommunication network connected via an intermediate network to a host computer in accordance with some embodiments.

Referring to FIG. 6, in accordance with an embodiment, a communication system includes a telecommunication network 600, such as a 3GPP-type cellular network, which comprises an access network 602, such as a radio access network, and a core network 608. The access network 602 comprises a plurality of base stations 604a, 604b, 604c, such as Node Bs, eNBs, gNBs, or other types of wireless access points, each defining a corresponding coverage area 606a, 606b, 606c. Each base station 604a, 604b, 604c is connectable to the core network 608 over a wired or wireless connection 610. A first UE 622 located in coverage area 606c is configured to wirelessly connect to, or be paged by, the corresponding base station 604c. A second UE 624 in coverage area 606a is wirelessly connectable to the corresponding base station 604a. While a plurality of UEs 622, 624 are illustrated in this example, the disclosed embodiments are equally applicable to a situation where a sole UE is in the coverage area 606 or where a sole UE is connecting to the corresponding base station 604.

The telecommunication network 600 is itself connected to a host computer 618, which may be embodied in the hardware and/or software of a standalone server, a cloud-implemented server, a distributed server, or as processing resources in a server farm. The host computer 618 may be under the ownership or control of a service provider, or may be operated by the service provider or on behalf of the service provider. Connections 614 and 616 between the telecommunication network 600 and the host computer 618 may extend directly from the core network 608 to the host computer 618 or may go via an optional intermediate network 612. The intermediate network 612 may be one of, or a combination of more than one of, a public, private, or hosted network; the intermediate network 612, if any, may be a backbone network or the Internet; in particular, the intermediate network 612 may comprise two or more sub-networks (not shown).

The communication system of FIG. 6 as a whole enables connectivity between the connected UEs 622, 624 and the host computer 618. The connectivity may be described as an Over-The-Top (OTT) connection 620. The host computer 618 and the connected UEs 622, 624 are configured to communicate data and/or signaling via the OTT connection 620, using the access network 602, the core network 608, any intermediate network 612, and possible further infrastructure (not shown) as intermediaries. The OTT connection 620 may be transparent in the sense that the participating communication devices through which the OTT connection 620 passes are unaware of routing of uplink and downlink communications. For example, the base station 604 may not or need not be informed about the past routing of an incoming downlink communication with data originating from the host computer 618 to be forwarded (e.g., handed over) to a connected UE 622. Similarly, the base station 604 need not be aware of the future routing of an outgoing uplink communication originating from the UE 622 towards the host computer 618.

Figure 7:
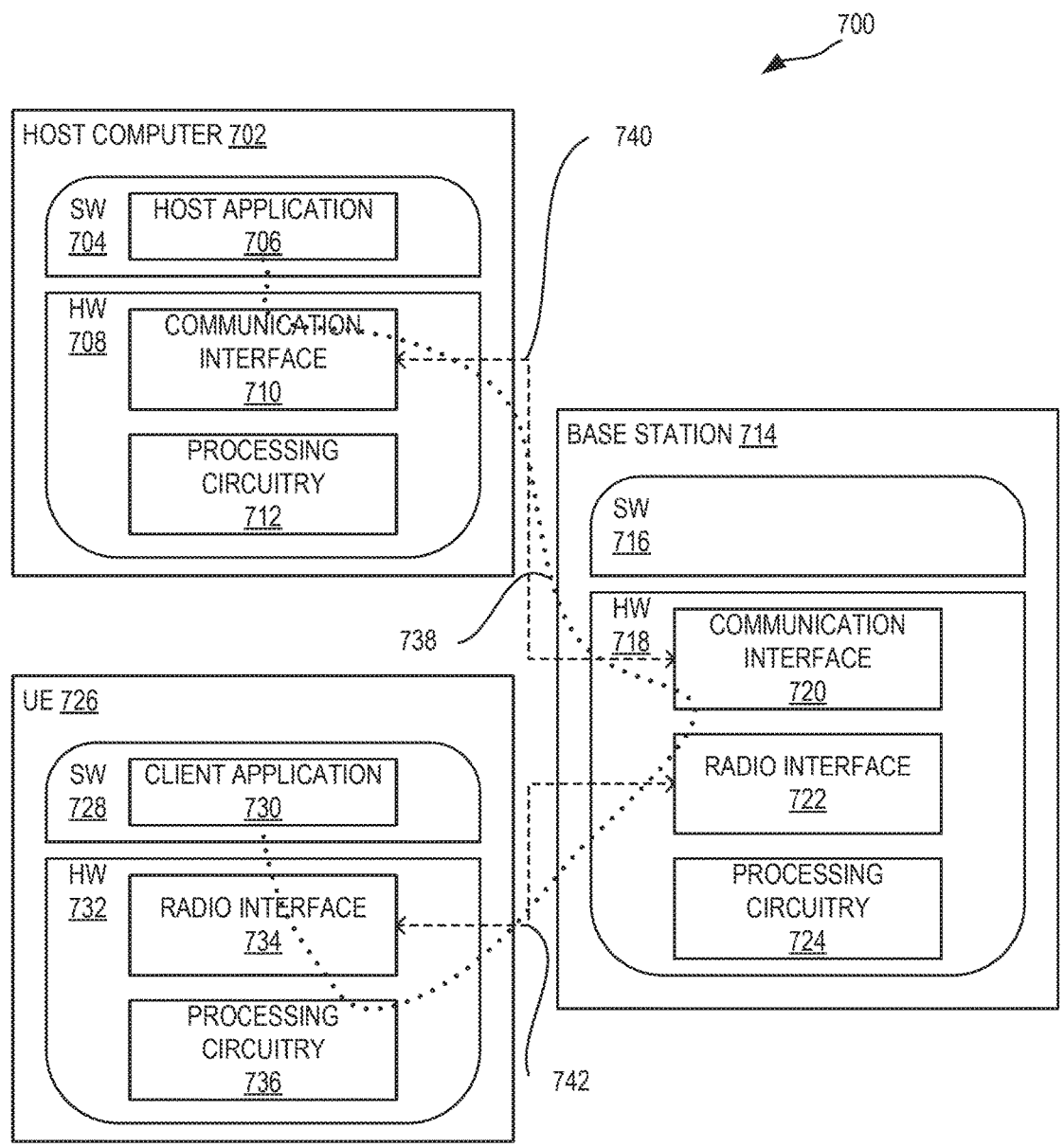
FIG. 7 illustrates a host computer communicating via a base station with a UE over a partially wireless connection in accordance with some embodiments of the present disclosure.

FIG. 7 illustrates a host computer communicating via a base station with a UE over a partially wireless connection in accordance with some embodiments.

Example implementations, in accordance with an embodiment, of the UE, base station, and host computer discussed in the preceding paragraphs will now be described with reference to FIG. 7. In a communication system 700, a host computer 702 comprises hardware 708 including a communication interface 710 configured to set up and maintain a wired or wireless connection with an interface of a different communication device of the communication system 700. The host computer 702 further comprises processing circuitry 712, which may have storage and/or processing capabilities. In particular, the processing circuitry 712 may comprise one or more programmable processors, ASICs, FPGAs, or combinations of these (not shown) adapted to execute instructions. The host computer 702 further comprises software 704, which is stored in or accessible by the host computer 702 and executable by the processing circuitry 712. The software 704 includes a host application 706. The host application 706 may be operable to provide a service to a remote user, such as a UE 726 connecting via an OTT connection 738 terminating at the UE 726 and the host computer 702. In providing the service to the remote user, the host application 706 may provide user data which is transmitted using the OTT connection 738.

The communication system 700 further includes a base station 714 provided in a telecommunication system and comprising hardware 718 enabling it to communicate with the host computer 702 and with the UE 726. The hardware 718 may include a communication interface 720 for setting up and maintaining a wired or wireless connection with an interface of a different communication device of the communication system 700, as well as a radio interface 722 for setting up and maintaining at least a wireless connection 742 with the UE 726 located in a coverage area (not shown in FIG. 7) served by the base station 714. The communication interface 720 may be configured to facilitate a connection 740 to the host computer 702. The connection 740 may be direct or it may pass through a core network (not shown in FIG. 7) of the telecommunication system and/or through one or more intermediate networks outside the telecommunication system. In the embodiment shown, the hardware 718 of the base station 714 further includes processing circuitry 724, which may comprise one or more programmable processors, ASICs, FPGAs, or combinations of these (not shown) adapted to execute instructions. The base station 714 further has software 716 stored internally or accessible via an external connection.

The communication system 700 further includes the UE 726 already referred to. Its hardware 732 may include a radio interface 734 configured to set up and maintain the wireless connection 742 with the base station 714 serving a coverage area in which the UE 726 is currently located. The hardware 732 of the UE 726 further includes processing circuitry 736, which may comprise one or more programmable processors, ASICs, FPGAs, or combinations of these (not shown) adapted to execute instructions. The UE 726 further comprises software 728, which is stored in or accessible by the UE 726 and is executable by the processing circuitry 736. The software 728 includes a client application 730. The client application 730 may be operable to provide a service to a human or non-human user via the UE 726, with the support of the host computer 702. In the host computer 702, an executing host application 706 may communicate with the executing client application 730 via the OTT connection 738 terminating at the UE 726 and the host computer 702. In providing the service to the user, the client application 730 may receive request data from the host application 706 and provide user data in response to the request data. The OTT connection 738 may transfer both the request data and the user data. The client application 730 may interact with the user to generate the user data that it provides.

It is noted that the host computer 702, the base station 714, and the UE 726 illustrated in FIG. 7 may be similar or identical to the host computer 618, one of the base stations 604a, 604b, 604c, and one of the UEs 622, 624 of FIG. 6, respectively. This is to say, the inner workings of these entities may be as shown in FIG. 7 and independently, the surrounding network topology may be that of FIG. 6.

In FIG. 7, the OTT connection 738 has been drawn abstractly to illustrate the communication between the host computer 702 and the UE 726 via the base station 714, without explicit reference to any intermediary devices and the precise routing of messages via these devices. The network infrastructure may determine the routing, which it may be configured to hide from the UE 726 or from the service provider operating the host computer 702, or both. While the OTT connection 738 is active, the network infrastructure may further take decisions by which it dynamically changes the routing (e.g., on the basis of load balancing consideration or reconfiguration of the network).

The wireless connection 742 between the UE 726 and the base station 714 is in accordance with the teachings of the embodiments described throughout this disclosure. One or more of the various embodiments improve the performance of OTT services provided to the UE 726 using the OTT connection 738, in which the wireless connection 742 forms the last segment.

A measurement procedure may be provided for the purpose of monitoring data rate, latency, and other factors on which the one or more embodiments improve. There may further be an optional network functionality for reconfiguring the OTT connection 738 between the host computer 702 and the UE 726, in response to variations in the measurement results. The measurement procedure and/or the network functionality for reconfiguring the OTT connection 738 may be implemented in the software 704 and the hardware 708 of the host computer 702 or in the software 728 and the hardware 732 of the UE 726, or both. In some embodiments, sensors (not shown) may be deployed in or in association with communication devices through which the OTT connection 738 passes; the sensors may participate in the measurement procedure by supplying values of the monitored quantities exemplified above, or supplying values of other physical quantities from which the software 704, 728 may compute or estimate the monitored quantities. The reconfiguring of the OTT connection 738 may include message format, retransmission settings, preferred routing, etc.; the reconfiguring need not affect the base station 714, and it may be unknown or imperceptible to the base station 714. Such procedures and functionalities may be known and practiced in the art. In certain embodiments, measurements may involve proprietary UE signaling facilitating the host computer 702's measurements of throughput, propagation times, latency, and the like. The measurements may be implemented in that the software 704 and 728 causes messages to be transmitted, in particular empty or 'dummy' messages, using the OTT connection 738 while it monitors propagation times, errors, etc.

FIG. 8 is a flowchart illustrating a method 800 implemented in a communication system, in accordance with one embodiment. The communication system includes a host computer, a base station, and a UE which may be those described with reference to FIGS. 4 and 5. For the sake of brevity, only drawing references to FIG. 8 will be included in this section. In step 802, the host computer provides user data. In substep 804 (which may be optional) of step 802, the host computer provides the user data by executing a host application. In step 806, the host computer initiates a transmission carrying the user data to the UE. In step 808 (which may be optional), the base station transmits to the UE the user data which was carried in the transmission that the host computer initiated, in accordance with the teachings of the embodiments described throughout this disclosure. In step 810 (which may also be optional), the UE executes a client application associated with the host application executed by the host computer.

FIG. 9 is a flowchart illustrating a method 900 implemented in a communication system, in accordance with one embodiment. The communication system includes a host computer, a base station, and a UE which may be those described with reference to FIGS. 4 and 5. For simplicity of the present disclosure, only drawing references to FIG. 9 will be included in this section. In step 902 of the method 900, the host computer provides user data. In an optional substep (not shown) the host computer provides the user data by executing a host application. In step 904, the host computer initiates a transmission carrying the user data to the UE. The transmission may pass via the base station, in accordance with the teachings of the embodiments described throughout this disclosure. In step 906 (which may be optional), the UE receives the user data carried in the transmission.

Figures 10, 11:
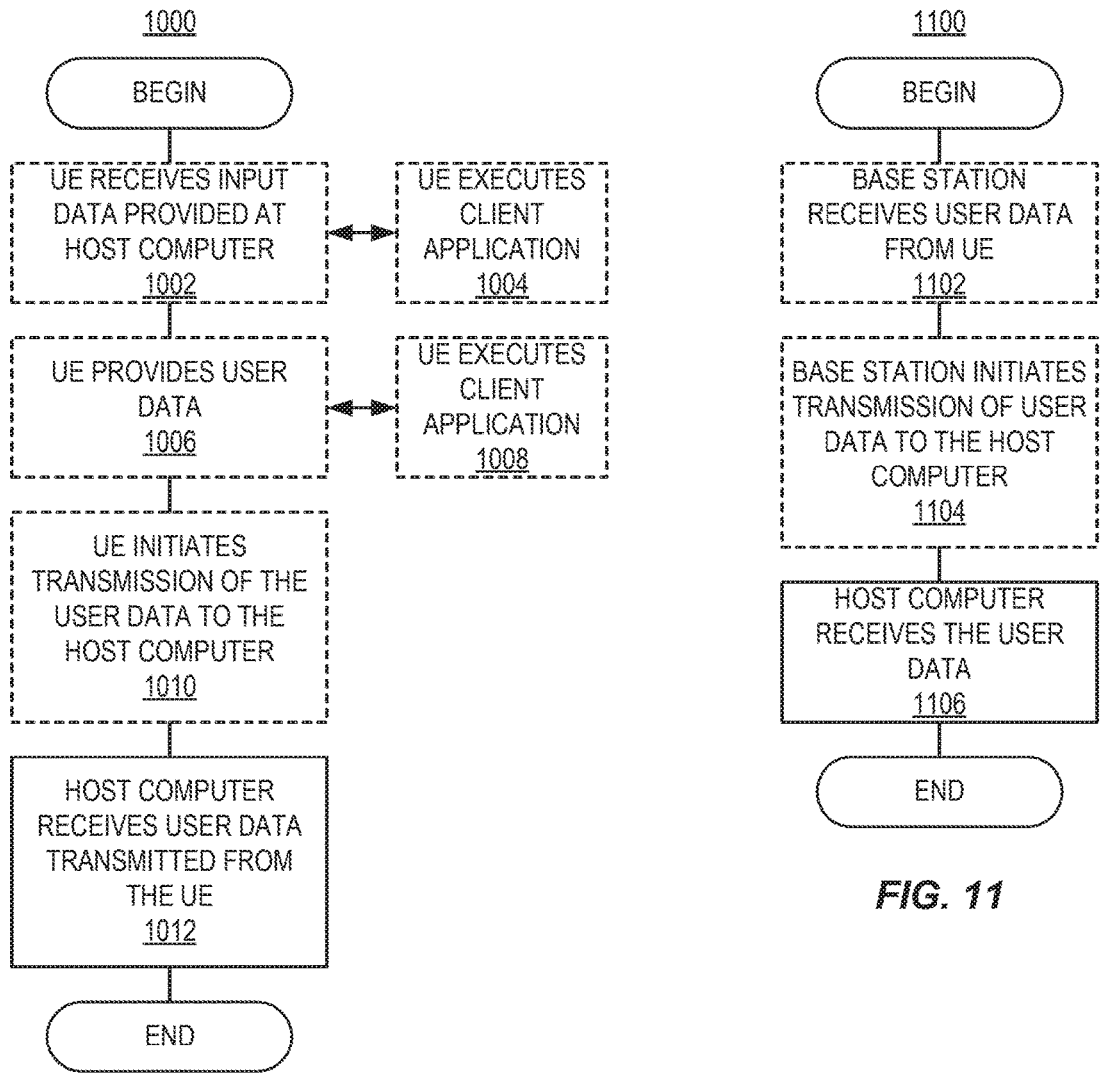
FIG. 10 illustrates methods implemented in a communication system including a host computer, a base station, and a UE in accordance with some embodiments of the present disclosure.
FIG. 11 illustrates methods implemented in a communication system including a host computer, a base station, and a UE in accordance with some embodiments of the present disclosure.

FIG. 10 is a flowchart illustrating a method 1000 implemented in a communication system, in accordance with one embodiment. The communication system includes a host computer, a base station, and a UE which may be those described with reference to FIGS. 4 and 5. For simplicity of the present disclosure, only drawing references to FIG. 10 will be included in this section. In step 1002 (which may be optional), the UE receives input data provided by the host computer. Additionally or alternatively, in step 1006, the UE provides user data. In substep 1008 (which may be optional) of step 1006, the UE provides the user data by executing a client application. In substep 1004 (which may be optional) of step 1002, the UE executes a client application which provides the user data in reaction to the received input data provided by the host computer. In providing the user data, the executed client application may further consider user input received from the user. Regardless of the specific manner in which the user data was provided, the UE initiates, in substep 1010 (which may be optional), transmission of the user data to the host computer. In step 1012 of the method, the host computer receives the user data transmitted from the UE, in accordance with the teachings of the embodiments described throughout this disclosure.

FIG. 11 is a flowchart illustrating a method 1100 implemented in a communication system, in accordance with one embodiment. The communication system includes a host computer, a base station, and a UE which may be those described with reference to FIGS. 4 and 5. For simplicity of the present disclosure, only drawing references to FIG. 11 will be included in this section. In step 1102 (which may be optional), in accordance with the teachings of the embodiments described throughout this disclosure, the base station receives user data from the UE. In step 1104 (which may be optional), the base station initiates transmission of the received user data to the host computer. In step 1106 (which may be optional), the host computer receives the user data carried in the transmission initiated by the base station.

Figure 12:
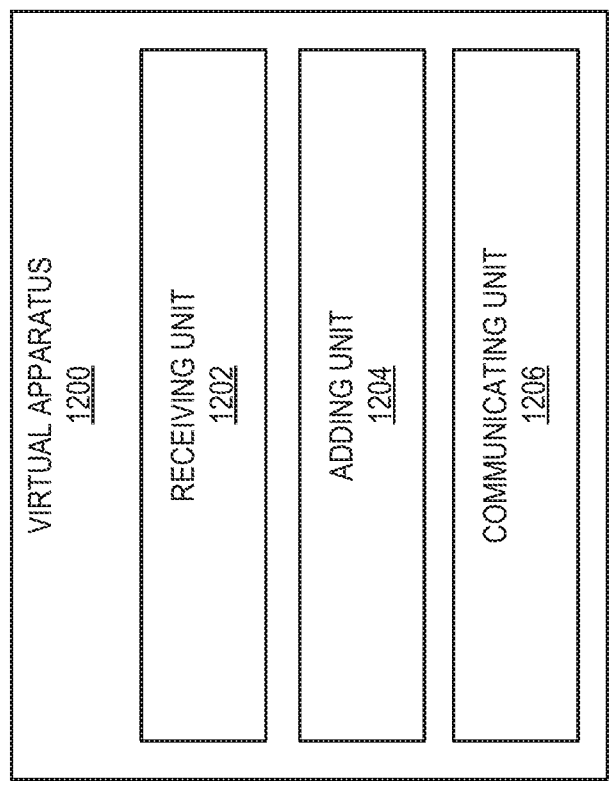
FIG. 12 illustrates a virtualization apparatus in accordance with some embodiments of the present disclosure.
Figure 13:
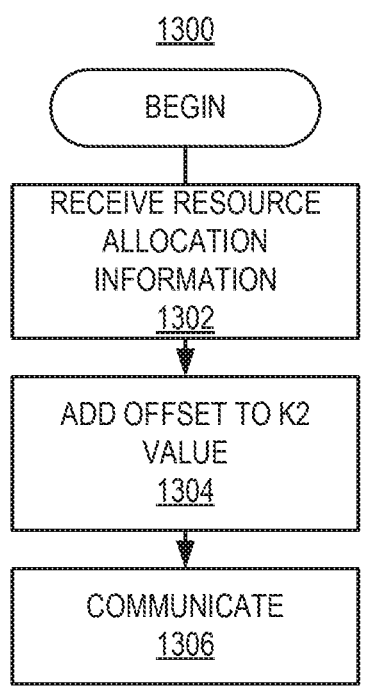
FIG. 13 illustrates a method in accordance with some embodiments of the present disclosure.

FIG. 12 illustrates a schematic block diagram of an apparatus 1200 in a wireless network (for example, the wireless network shown in FIG. 3). The apparatus 1200 may be implemented in a wireless device or a network node (e.g., the wireless device 304 or the network node 334 shown in FIG. 3). The apparatus 1200 is operable to carry out the example method described with reference to FIG. 13 and possibly any other processes or methods disclosed herein. It is also to be understood that the method of FIG. 13 is not necessarily carried out solely by the apparatus 1200. At least some operations of the method can be performed by one or more other entities.

The virtual apparatus 1200 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in the memory includes program instructions for executing one or more telecommunications and/or data communications protocols as well as instructions for carrying out one or more of the techniques described herein, in several embodiments. In some implementations, the processing circuitry may be used to cause a receiving unit 1202, an adding unit 1204, a communicating unit 1206, and any other suitable units of the apparatus 1200 to perform corresponding functions according one or more embodiments of the present disclosure.

As illustrated in FIG. 12, the apparatus 1200 comprises the receiving unit 1202, the adding unit 1204, and the communicating unit 1206. The receiving unit 1202 is configured to receive time-domain resource allocation information from a network node in a Msg2 of an initial access procedure. The adding unit 1204 is configured to, in response to receiving the time-domain resource allocation information in the Msg2, add an offset to a K2 value signaled in the time-domain resource allocation. The communicating unit 1206 is configured to communicate (e.g., transmit or receive) and/or process information according to the Msg2.

The term "unit" may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 13 illustrates a method 1300 according to some embodiments.

Referring to FIG. 13, the method 1300 comprises performing operations 1302, 1304, and 1306, which correspond to the respective functions of the units 1202, 1204, and 1006 of FIG. 12.

As discussed above, in some embodiments, a single time-domain resource allocation table is signaled/configured for PUSCH and Msg3. The time-domain resource allocation table for Msg3 (when signaled in Msg2) is derived from the signaled/configured PUSCH table by adding an offset.

Embodiment 1: Re-Use of PUSCH Table

The default PUSCH table or SIB1 configured PUSCH table, (or dedicated PUSCH table) is reused. However, an offset is added to the K2 value signaled in the time-domain resource allocation to account for the additional processing time. Note, this offset is only added if the time-domain resource allocation is signaled in Msg2. The offset varies in relation to the additional processing time needed for Msg2 decoding compared to Physical Downlink Control Channel (PDCCH) decoding and rounded to the next higher (or, less preferred, lower) number of slots in uplink numerology $\mu_{UL}$. If the additional processing time is denoted $T_{add}$, and the time-domain resource allocation in Msg2 signals a K2 value $K_{2,Msg2}$, the true K2 is determined according to (assuming rounding up):

$$K_2 = K_{2,Msg2} + \left\lceil \frac{T_{add}}{T_{UL,slot}} \right\rceil \cdot T_{UL,slot}$$

with $T_{UL,slot}$ being the duration of an uplink slot. In one example, $T_{add}=N_1 \cdot (2048+144) \cdot \kappa \cdot 2^{-\mu_{UL}} \cdot T_c + 0.5$ ms with $N_1$ taken from Table 2 with additional DM-RS configured. Other values of $T_{add}$ are proposed in Embodiment 2.

Embodiment 2: Additional Values of $T_{add}$

The description above illustrates that for a short PDSCH the decoding time is extended (since decoding for a very short PDSCH might extend a bit longer after PDSCH has ended than a longer PDSCH). Therefore, if Msg2 is transmitted in a short PDSCH Type A, an additional value could be added to $T_{add}$. As an example, it can be considered if PDSCH with mapping Type A stops in the i-th symbol with i<7, an additional term could be added: $d_{1,3}=7-i$ if i<7, otherwise $d_{1,3}=0$.

$$T_{add}=(N_1+d_{1,3}) \cdot (2048+144) \cdot \kappa \cdot 2^{-\mu_{UL}} \cdot T_c + 0.5 \text{ ms}$$

On the other hand, if PDSCH is very long (either long but still no slot aggregation or PDSCH is even transmitted with slot aggregation) PDSCH is finalized late and thus also decoding finalizes later. Since K2 is measured relative to beginning of the first slot where Msg2 is transmitted, another summand $d'_{1,3}$ can be added that increases with PDSCH length. In general, it can be considered to have a $d_{1,3}$ that is a function of the PDSCH (containing Msg2) length.

Another example of another $T_{add}$ follows: In case a UE is configured with multiple cells and the time difference between the cells (either TX and/or RX) can be larger than 0, and Msg3 is transmitted on the UL2 associated with a DL2 different from the DL1 that is used to send Msg2, it can happen that DL2 (and thus UL2) is earlier than DL1 by the maximum allowed time difference. To compensate for this value, a value $d_{1,2}$ can be added which accounts for the maximum time difference. $d_{1,2}$ would be larger than zero if a UE is configured (or configured and activated) with multiple cells that can have a time difference larger than zero. It can be considered to make $d_{1,2}>0$ as soon as a UE is configured (or configured and activated) with multiple cells irrespective which maximum time differences are expected. It can be considered to have in case $d_{1,2} \neq 0$ a fixed value or a value that depends on the actual or actually expected maximum time difference.

$$T_{add}=(N_1+d_{1,2}) \cdot (2048+144) \cdot \kappa \cdot 2^{-\mu_{UL}} \cdot T_c + 0.5 \text{ ms}$$

Combining $d_{1,2}$ and $d_{1,3}$ can also be considered.

$$T_{add}=(N_1+d_{1,2}+d_{1,3}) \cdot (2048+144) \cdot \kappa \cdot 2^{-\mu_{UL}} \cdot T_c + 0.5 \text{ ms}$$

While not being limited thereto, some example embodiments of the present disclosure are as follows.

Group A Embodiments

Embodiment 1: A method performed by a wireless device (e.g., a UE), comprising: (a) receiving time-domain resource allocation information from a network node in a Msg2 of an initial access procedure; (b) in response to receiving the time-domain resource allocation information in the Msg2, adding an offset to a K2 value signaled in the time-domain resource allocation; and (c) communicating (e.g., transmitting or receiving) and/or processing information according to the Msg2.

Embodiment 1.1: The method of embodiment 1, wherein the offset is based on an additional processing time needed for Msg2 decoding compared to PDCCH decoding and rounded to a next higher (or, less preferred, lower) number of slots in uplink numerology $\mu_{UL}$.

Embodiment 1.2: The method of embodiment 1.1, wherein the additional processing time is denoted $T_{add}$, and the time-domain resource allocation in Msg2 signals a K2 value $K_{2,Msg2}$, and the true K2 is determined according to (assuming rounding up).

$$K_2 = K_{2,Msg2} + \left\lceil \frac{T_{add}}{T_{UL,slot}} \right\rceil \cdot T_{UL,slot}$$

with $T_{UL,slot}$ the duration of an uplink slot. In one example, $T_{add}=N_1 \cdot (2048+144) \cdot \kappa \cdot 2^{-\mu_{UL}} \cdot T_c + 0.5$ ms with $N_1$ taken from Table 2 with additional DM-RS configured.

Embodiment 1.3: The method of embodiment 1, wherein if Msg2 is transmitted in a short PDSCH Type A, an additional value is added to $T_{add}$.

Embodiment 1.3.1: The method of embodiment 1.3, wherein if PDSCH with mapping Type A stops in an i-th symbol with i<7, an additional term is added as follows: $d_{1,3}=7-i$ if i<7, otherwise $d_{1,3}=0$.

$$T_{add}=(N_1+d_{1,3}) \cdot (2048+144) \cdot \kappa \cdot 2^{-\mu_{UL}} \cdot T_c + 0.5 \text{ ms}$$

Embodiment 1.4: The method of embodiment 1, wherein if PDSCH is relatively long (either long but still no slot aggregation or PDSCH is even transmitted with slot aggregation) PDSCH is finalized late and thus also decoding finalizes later. Since K2 is measured relative to beginning of the first slot where Msg2 is transmitted, another summand $d'_{1,3}$ is added that increases with PDSCH length. In general, it can be considered to have a $d_{1,3}$ that is a function of the PDSCH (containing Msg2) length.

Embodiment 1.5: The method of embodiment 1, wherein the UE is configured with multiple cells and the time difference between the cells (either transmit and/or receive) can be larger than 0, and Msg3 is transmitted on the UL2 associated with a DL2 different from the DL1 that is used to send Msg2, it can happen that DL2 (and thus UL2) is earlier than DL1 by the maximum allowed time difference. To compensate for this value, a value $d_{1,2}$ can be added which accounts for the maximum time difference. $d_{1,2}$ would be larger than zero if a UE is configured (or configured and activated) with multiple cells that can have a time difference larger than zero. It can be considered to make $d_{1,2}>0$ as soon a UE is configured (or configured and activated) with multiple cells irrespective which maximum time differences are expected. It can be considered to have in case $d_{1,2} \neq 0$ a fixed value or a value that depends on the actual or actually expected maximum time difference.

$$T_{add}=(N_1+d_{1,2}) \cdot (2048+144) \cdot \kappa \cdot 2^{-\mu_{UL}} \cdot T_c + 0.5 \text{ ms}$$

Embodiment 1.6: The method of embodiment 1.5, wherein $d_{1,2}$ and $d_{1,3}$ are combined as follows:

$$T_{add}=(N_1+d_{1,2}+d_{1,3}) \cdot (2048+144) \cdot \kappa \cdot 2^{-\mu_{UL}} \cdot T_c + 0.5 \text{ ms}$$

Embodiment 2: The method of any of the previous embodiments, further comprising: providing user data; and forwarding the user data to a host computer via the transmission to the base station.

Group B Embodiments

Embodiment 3: A method performed by a base station, comprising transmitting time-domain resource allocation information from the base station to a user equipment in a Msg2 of an initial access procedure wherein, in response to receiving the time-domain resource allocation information in the Msg2, the UE adds an offset to a K2 value signaled in the time-domain resource allocation.

Embodiment 4: The method of any of the previous embodiments, further comprising obtaining user data; and forwarding the user data to a host computer or a wireless device.

Group C Embodiments

Embodiment 5: A wireless device, comprising: processing circuitry configured to perform any of the steps of any of the Group A embodiments; and power supply circuitry configured to supply power to the wireless device.

Embodiment 6: A base station, comprising: processing circuitry configured to perform any of the steps of any of the Group B embodiments; and power supply circuitry configured to supply power to the wireless device.

Embodiment 7: A User Equipment (UE), comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 8: A communication system including a host computer comprising: processing circuitry configured to provide user data; and a communication interface configured to forward the user data to a cellular network for transmission to a User Equipment (UE), wherein the cellular network comprises a base station having a radio interface and processing circuitry, the base station's processing circuitry configured to perform any of the steps of any of the Group B embodiments.

Embodiment 9: The communication system of the previous embodiment further including the base station.

Embodiment 10: The communication system of the previous 2 embodiments, further including the UE, wherein the UE is configured to communicate with the base station.

Embodiment 11: The communication system of the previous 3 embodiments, wherein: the processing circuitry of the host computer is configured to execute a host application, thereby providing the user data; and the UE comprises processing circuitry configured to execute a client application associated with the host application.

Embodiment 12: A method implemented in a communication system including a host computer, a base station, and a User Equipment (UE), the method comprising: at the host computer, providing user data; and at the host computer, initiating a transmission carrying the user data to the UE via a cellular network comprising the base station, wherein the base station performs any of the steps of any of the Group B embodiments.

Embodiment 13: The method of the previous embodiment, further comprising, at the base station, transmitting the user data.

Embodiment 14: The method of the previous 2 embodiments, wherein the user data is provided at the host computer by executing a host application, the method further comprising, at the UE, executing a client application associated with the host application.

Embodiment 15: A User Equipment (UE) configured to communicate with a base station, the UE comprising a radio interface and processing circuitry configured to performs the method of the previous 3 embodiments.

Embodiment 16: A communication system including a host computer comprising: processing circuitry configured to provide user data; and a communication interface configured to forward user data to a cellular network for transmission to a User Equipment (UE), wherein the UE comprises a radio interface and processing circuitry, the UE's components configured to perform any of the steps of any of the Group A embodiments.

Embodiment 17: The communication system of the previous embodiment, wherein the cellular network further includes a base station configured to communicate with the UE.

Embodiment 18: The communication system of the previous 2 embodiments, wherein: the processing circuitry of the host computer is configured to execute a host application, thereby providing the user data; and the UE's processing circuitry is configured to execute a client application associated with the host application.

Embodiment 19: A method implemented in a communication system including a host computer, a base station, and a User Equipment (UE), the method comprising: at the host computer, providing user data; and at the host computer, initiating a transmission carrying the user data to the UE via a cellular network comprising the base station, wherein the UE performs any of the steps of any of the Group A embodiments.

Embodiment 20: The method of the previous embodiment, further comprising at the UE, receiving the user data from the base station.

Embodiment 21: A communication system including a host computer comprising: communication interface configured to receive user data originating from a transmission from a User Equipment (UE) to a base station, wherein the UE comprises a radio interface and processing circuitry, the UE's processing circuitry configured to perform any of the steps of any of the Group A embodiments.

Embodiment 22: The communication system of the previous embodiment, further including the UE.

Embodiment 23: The communication system of the previous 2 embodiments, further including the base station, wherein the base station comprises a radio interface configured to communicate with the UE and a communication interface configured to forward to the host computer the user data carried by a transmission from the UE to the base station.

Embodiment 24: The communication system of the previous 3 embodiments, wherein: the processing circuitry of the host computer is configured to execute a host application; and the UE's processing circuitry is configured to execute a client application associated with the host application, thereby providing the user data.

Embodiment 25: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 26: A method implemented in a communication system including a host computer, a base station, and a User Equipment (UE), the method comprising: at the host computer, receiving user data transmitted to the base station from the UE, wherein the UE performs any of the steps of any of the Group A embodiments.

Embodiment 27: The method of the previous embodiment, further comprising, at the UE, providing the user data to the base station.

Embodiment 28: The method of the previous 2 embodiments, further comprising: at the UE, executing a client application, thereby providing the user data to be transmitted; and at the host computer, executing a host application associated with the client application.

Embodiment 29: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 30: A communication system including a host computer comprising a communication interface configured to receive user data originating from a transmission from a User Equipment (UE) to a base station, wherein the base station comprises a radio interface and processing circuitry, the base station's processing circuitry configured to perform any of the steps of any of the Group B embodiments.

Embodiment 31: The communication system of the previous embodiment further including the base station.

Embodiment 32: The communication system of the previous 2 embodiments, further including the UE, wherein the UE is configured to communicate with the base station.

Embodiment 33: The communication system of the previous 3 embodiments, wherein: the processing circuitry of the host computer is configured to execute a host application; the UE is configured to execute a client application associated with the host application, thereby providing the user data to be received by the host computer.

Embodiment 34: A method implemented in a communication system including a host computer, a base station, and a User Equipment (UE), the method comprising: at the host computer, receiving, from the base station, user data originating from a transmission which the base station has received from the UE, wherein the UE performs any of the steps of any of the Group A embodiments.

Embodiment 35: The method of the previous embodiment, further comprising at the base station, receiving the user data from the UE.

Embodiment 36: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP 3rd Generation Partnership Project
4G Fourth Generation
5G 5th Generation
AC Alternating Current
ACK Acknowledgement
AP Access Point
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
COTS Commercial Off-The-Shelf
CPE Customer Premise Equipment
CPU Central Processing Unit
D2D Device-to-Device
DAS Distributed Antenna System
DC Direct Current
DCI Downlink Control Information
DIMM Dual In-Line Memory Module
DM-RS Demodulation Reference Signal
DSP Digital Signal Processor
DVD Digital Video Disk
EEPROM Electrically Erasable Programmable Read Only Memory
eMTC Enhanced Machine Type Communication
eNB Enhanced or Evolved Node B
EPROM Erasable Programmable Read Only Memory
E-SMLC Evolved Serving Mobile Location Center
FPGA Field Programmable Gate Array
GHz Gigahertz
gNB New Radio Base Station
GPS Global Positioning System
GSM Global System for Mobile Communication
HDDS Holographic Digital Data Storage
HD-DVD High-Density Digital Versatile Disc
I/O Input and Output
IoT Internet of Things
IP Internet Protocol
kHz Kilohertz
LAN Local Area Network
LEE Laptop Embedded Equipment
LME Laptop Mounted Equipment
LTE Long-Term Evolution
M2M Machine-to-Machine
MAC Medium Access Control
MANO Management and Orchestration
MCE Multi-Cell/Multicast Coordination Entity
MDT Minimization of Drive Tests
MIMO Multiple Input Multiple Output
MME Mobility Management Entity
ms Millisecond
MSC Mobile Switching Center
MSR Multi-Standard Radio
MTC Machine Type Communication
NACK Negative Acknowledgement
NB-IoT Narrowband Internet of Things
NFV Network Function Virtualization
NIC Network Interface Controller
NR New Radio
O&M Operation and Maintenance
OFDMA Orthogonal Frequency Division Multiple Access
OSS Operations Support System
OTT Over-The-Top
PDA Personal Digital Assistant
PDCCH Physical Downlink Control Channel
PDSCH Physical Downlink Shared Channel
PROM Programmable Read Only Memory
PSTN Public Switched Telephone Network
PUSCH Physical Uplink Shared Channel
RAID Redundant Array Of Independent Disks
RAM Random Access Memory
RAN Radio Access Network
RAR Random Access Response
RAT Radio Access Technology
RF Radio Frequency
RNC Radio Network Controller
ROM Read Only Memory
RRC Radio Resource Control
RRH Remote Radio Head
RRU Remote Radio Unit
RUIM Removable User Identity
SDRAM Synchronous Dynamic Random Access Memory
SIB System Information Block
SIM Subscriber Identity Module
SOC System on a Chip
SON Self Optimized Network
SONET Synchronous Optical Networking
TA Timing Advance
TCP Transmission Control Protocol
TS Technical Specification
UE User Equipment
UMTS Universal Mobile Telecommunication System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method implemented in a User Equipment, UE, for a cellular communications system, comprising:
receiving a Random Access Response, RAR, message comprising an indication of a time-domain resource allocation for a Msg3 transmission on a Physical Uplink Shared Channel, PUSCH;

determining a slot offset value, K2, for the Msg3 transmission based on the indication of the time-domain resource allocation and a PUSCH table stored in the UE; and transmitting the Msg3 transmission in accordance with an increased slot offset value that corresponds to a sum of the slot offset value, K2, and an additional slot offset value, wherein the additional slot offset value corresponds to a subcarrier spacing of the PUSCH, and wherein the additional slot offset value varies in relation to an additional processing time needed for RAR message decoding compared to Physical Downlink Control Channel, PDCCH, decoding.

2. The method of claim 1 wherein the PUSCH table is configured via system information or higher layer signaling.

3. The method of claim 1 wherein the additional slot offset value is rounded to a next higher number of slots in an uplink numerology of the PUSCH.

4. The method of claim 3 wherein:
the additional slot offset value is defined in accordance with:

$$\text{additional\_slot\_offset} = \left\lceil \frac{T_{add}}{T_{UL,slot}} \right\rceil \cdot T_{UL,slot}$$

where $T_{add}$ denotes the additional processing time and $T_{UL,slot}$ denotes a duration of an uplink slot for the uplink numerology of the PUSCH; and
the increased slot offset value is:

$$K_{2,increased} = K_2 + \text{dditional\_slot\_offset}$$

where $K_{2,increased}$ denotes the increased slot offset value and $K_2$ denotes the slot offset value, K2, comprised in the time-domain resource allocation.

5. The method of claim 3 wherein the additional processing time, $T_{add}$, is:

$$T_{add} = N_1 \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, and $T_c = 1/(4096 \cdot 480e3)$.

6. The method of claim 3 wherein the additional processing time is a function of whether the RAR message is transmitted in a short Physical Downlink Shared Channel, PDSCH, with mapping Type A.

7. The method of claim 3 wherein the RAR message is transmitted in a short Physical Downlink Shared Channel, PDSCH, with mapping Type A that stops in an i-th symbol, and the additional processing time, $T_{add}$, is:

$$T_{add} = (N_1 + d_{1,3}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c = 1/(4096 \cdot 480e3)$, and $d_{1,3}$ is:

$$d_{1,3} = \begin{cases} 7-i & \text{if } i < 7 \\ 0 & \text{otherwise} \end{cases}.$$

8. The method of claim 3 wherein the additional processing time, $T_{add}$, is:

$$T_{add} = (N_1 + d_{1,3}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c = 1/(4096 \cdot 480e3)$, and $d_{1,3}$ is a function of a length of a PDSCH containing the RAR message.

9. The method of claim 3 wherein:
the UE is configured with two or more cells and a time difference between the two or more cells is larger than zero; and
the additional processing time, $T_{add}$, is:

$$T_{add} = (N_1 + d_{1,2}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c = 1/(4096 \cdot 480e3)$, and $d_{1,2}$ is a value that accounts to a maximum allowed time difference between cells.

10. The method of claim 3 wherein:
the UE is configured with two or more cells and a time difference between the two or more cells is larger than zero; and
the additional processing time, $T_{add}$, is:

$$T_{add} = (N_1 + d_{1,2} + d_{1,3}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c = 1/(4096 \cdot 480e3)$, $d_{1,2}$ is a value that accounts to a maximum allowed time difference between cells, and $d_{1,3}$ is a function of a length of a PDSCH containing the RAR message.

11. The method of claim 1 wherein the additional slot offset value is rounded to a next lower number of slots in an uplink numerology of the PUSCH.

12. A User Equipment, UE, for a cellular communications system, comprising:
an interface comprising radio front end circuitry and one or more antennas; and
processing circuitry associated with the interface, the processing circuitry operable to cause the UE to:
receive a Random Access Response, RAR, message comprising an indication of a time-domain resource allocation for a Msg3 transmission on a Physical Uplink Shared Channel, PUSCH;
determine a slot offset value, K2, for the Msg3 transmission based on the indication of the time-domain resource allocation and a PUSCH table stored in the UE; and
transmit the Msg3 transmission in accordance with an increased slot offset value that corresponds to a sum of the slot offset value, K2, and an additional slot offset value,
wherein the additional slot offset value corresponds to a subcarrier spacing of the PUSCH, and wherein the additional slot offset value varies in relation to an additional processing time needed for RAR message decoding compared to Physical Downlink Control Channel, PDCCH, decoding.

13. The UE of claim 12 wherein the PUSCH table is configured via system information or higher layer signaling.

14. The UE of claim 12 wherein the additional slot offset value is rounded to a next higher number of slots in an uplink numerology of the PUSCH.

15. The UE of claim 14 wherein:
the additional slot offset value is defined in accordance with:

$$\text{additional\_slot\_offset} = \left\lceil \frac{T_{add}}{T_{UL,slot}} \right\rceil \cdot T_{UL,slot}$$

where $T_{add}$ denotes the additional processing time and $T_{UL,slot}$ denotes a duration of an uplink slot for the uplink numerology of the PUSCH; and the increased slot offset value is:

$$K_{2,increased} = K_2 + \text{additional\_slot\_offset}$$

where $K_{2,increased}$ denotes the increased slot offset value and $K_2$ denotes the slot offset value, K2, comprised in the time-domain resource allocation.

16. The UE of claim 14 wherein the additional processing time, $T_{add}$, is:

$$T_{add} = N_1 \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, and $T_c=1/(4096 \cdot 480e3)$.

17. The UE of claim 14 wherein the additional processing time is a function of whether the RAR message is transmitted in a short Physical Downlink Shared Channel, PDSCH, with mapping Type A.

18. The UE of claim 14 wherein the RAR message is transmitted in a short Physical Downlink Shared Channel, PDSCH, with mapping Type A that stops in an i-th symbol, and the additional processing time, $T_{add}$, is:

$$T_{add} = (N_1 + d_{1,3}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c=1/(4096 \cdot 480e3)$, and $d_{1,3}$ is:

$$d_{1,3} = \begin{cases} 7-i & \text{if } i < 7 \\ 0 & \text{otherwise} \end{cases}.$$

19. The UE of claim 14 wherein the additional processing time, $T_{add}$, is:

$$T_{add} = (N_1 + d_{1,3}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c=1/(4096 \cdot 480e3)$, and $d_{1,3}$ is a function of a length of a PDSCH containing the RAR message.

20. The UE of claim 14 wherein:
the UE is configured with two or more cells and a time difference between the two or more cells is larger than zero; and
the additional processing time, $T_{add}$, is:

$$T_{add} = (N_1 + d_{1,2}) \cdot (2048+144) \cdot \kappa \cdot 2^{-\mu_{UL}} \cdot T_c + 0.5 \text{ ms}$$

where $N_1$ is a Physical Downlink Shared Channel, PDSCH, decoding time, $\kappa=64$, $\mu_{UL}$ is the uplink numerology of the PUSCH, $T_c=1/(4096 \cdot 480e3)$, and $d_{1,2}$ is a value that accounts to a maximum allowed time difference between cells.

21. The UE of claim 12 wherein the additional slot offset value is rounded to a next lower number of slots in an uplink numerology of the PUSCH.

22. A base station for a cellular communications system, comprising:
processing circuitry operable to cause the base station to:
transmit a Random Access Response, RAR, message to a User Equipment, UE, wherein:
the RAR message comprises an indication of a time-domain resource allocation for a Msg3 transmission on a Physical Uplink Shared Channel, PUSCH; and
the time-resource allocation comprises a slot offset value, K2, for the Msg3 transmission on the PUSCH; and
receive, from the UE, a Msg3 transmission on the PUSCH in accordance with an increased slot offset value corresponding to a sum of the slot offset value and an additional slot offset value for the Msg3 transmission on the PUSCH, wherein the additional slot offset value corresponds to a subcarrier spacing of the PUSCH, and wherein the additional slot offset value varies in relation to an additional processing time needed for RAR message decoding compared to Physical Downlink Control Channel, PDCCH, decoding.

23. The base station of claim 22 wherein the PUSCH table is configured via system information or higher layer signaling.

24. The base station of claim 22 wherein the additional slot offset value is rounded to a next higher number of slots in an uplink numerology of the PUSCH.

25. A method implemented in a base station for a cellular communications system, comprising:
transmitting a Random Access Response, RAR, message to a User Equipment, UE, wherein:
the RAR message comprises an indication of a time-domain resource allocation for a Msg3 transmission on a Physical Uplink Shared Channel, PUSCH; and
the time-resource allocation comprises a slot offset value, K2, for the Msg3 transmission on the PUSCH; and
receiving, from the UE, a Msg3 transmission on the PUSCH in accordance with an increased slot offset value corresponding to a sum of the slot offset value and an additional slot offset value for the Msg3 transmission on the PUSCH, wherein the additional slot offset value corresponds to a subcarrier spacing of the PUSCH, and wherein the additional slot offset value varies in relation to an additional processing time needed for RAR message decoding compared to Physical Downlink Control Channel, PDCCH, decoding.

26. The method of claim 25 wherein the PUSCH table is configured via system information or higher layer signaling.

27. The method of claim 25 wherein the additional slot offset value is rounded to a next higher number of slots in an uplink numerology of the PUSCH.

* * * * *